United States Patent
Bajaj et al.

(10) Patent No.: US 12,541,450 B2
(45) Date of Patent: Feb. 3, 2026

(54) AUTOMATICALLY VARYING SYSTEM CLOCKS TO SIMULATE TEST ENVIRONMENTS FOR APPLICATION TRIGGERS GENERATED USING MACHINE LEARNING

(71) Applicant: Click Therapeutics, Inc., New York, NY (US)

(72) Inventors: Apoorv Bajaj, Delhi (IN); Yinxiang Gao, New York, NY (US); Ritesh Manchanda, New York, NY (US); Chuanhan Qiu, New York, NY (US)

(73) Assignee: Click Therapeutics, Inc, New York, NY (US)

( * ) Notice: Subject to any disclaimer, the term of this patent is extended or adjusted under 35 U.S.C. 154(b) by 0 days.

(21) Appl. No.: 19/080,750

(22) Filed: Mar. 14, 2025

(65) Prior Publication Data

US 2025/0390424 A1  Dec. 25, 2025

Related U.S. Application Data

(63) Continuation of application No. 18/748,002, filed on Jun. 19, 2024, now Pat. No. 12,277,053.

(51) Int. Cl.
*G06F 11/3668* (2025.01)

(52) U.S. Cl.
CPC ...... *G06F 11/3688* (2013.01); *G06F 11/3696* (2013.01)

(58) Field of Classification Search
CPC .......... G06F 11/3688; G06F 11/3696
See application file for complete search history.

(56) References Cited

U.S. PATENT DOCUMENTS

| | | | |
|---|---|---|---|
| 6,229,430 B1 | 5/2001 | Smith Dewey | |
| 6,480,830 B1* | 11/2002 | Ford | G06Q 10/1095 705/7.19 |
| 6,823,263 B1 | 11/2004 | Kelly et al. | |
| 7,426,190 B2 | 9/2008 | Manjeshwar et al. | |
| 7,454,681 B2* | 11/2008 | Reichert | G01R 31/319 714/740 |
| 7,506,035 B1* | 3/2009 | Lu | G04G 15/006 709/219 |
| 7,979,496 B2* | 7/2011 | Shankar | H04L 12/66 709/219 |
| 8,250,163 B2* | 8/2012 | Castaldo | G06F 11/3495 700/83 |

(Continued)

OTHER PUBLICATIONS

Non-Final Office Action on U.S. Appl. No. 18/748,002 dated Aug. 29, 2024.

(Continued)

*Primary Examiner* — Douglas M Slachta
(74) *Attorney, Agent, or Firm* — Foley & Lardner LLP

(57) ABSTRACT

Provided herein are systems and methods for simulating testing environments for digital therapeutic applications to address conditions over spans of time. A computing system may select a trigger of an event scheduler. The computing system may update a clock on a service or user device. The computing system may identify that content is communicated between the service and the user device in accordance with the trigger. The computing system may determine that the trigger of the event scheduler is validated.

28 Claims, 8 Drawing Sheets

(56) References Cited

U.S. PATENT DOCUMENTS

| | | | |
|---|---|---|---|
| 8,321,515 B1* | 11/2012 | Gailloux | H04L 51/234 |
| | | | 709/224 |
| 10,021,214 B2* | 7/2018 | Leeb | H04L 67/131 |
| 11,183,043 B1 | 11/2021 | Stapleford et al. | |
| 11,438,347 B2* | 9/2022 | Teshome | H04W 12/12 |
| 12,124,881 B2 | 10/2024 | Talavera | |
| 12,277,053 B1* | 4/2025 | Bajaj | G06F 11/3688 |
| 2008/0140862 A1 | 6/2008 | Elston et al. | |
| 2009/0144409 A1* | 6/2009 | Dickerson | G06F 11/3495 |
| | | | 709/224 |
| 2009/0154344 A1 | 6/2009 | Nishida | |
| 2009/0248803 A1* | 10/2009 | Akaboshi | G06Q 10/06 |
| | | | 709/224 |
| 2011/0167357 A1* | 7/2011 | Benjamin | H04M 1/72457 |
| | | | 715/753 |
| 2012/0025944 A1* | 2/2012 | Hansen | H04W 4/029 |
| | | | 713/502 |
| 2015/0378877 A1 | 12/2015 | Bhattacharya | |
| 2019/0044796 A1 | 2/2019 | Kacin et al. | |
| 2020/0210225 A1 | 7/2020 | Priyadarshi | |
| 2022/0122721 A1* | 4/2022 | Alberico | G16H 50/20 |
| 2023/0385450 A1 | 11/2023 | Bessette et al. | |
| 2024/0223489 A1* | 7/2024 | Wu | H04L 43/106 |

OTHER PUBLICATIONS

Notice of Allowance on U.S. Appl. No. 18/748,002 dated Dec. 23, 2024.

European Search Report on EP Appl. No. 25172006 dated Nov. 17, 2025.

\* cited by examiner

AUTOMATICALLY VARYING SYSTEM CLOCKS TO SIMULATE TEST ENVIRONMENTS FOR APPLICATION TRIGGERS GENERATED USING MACHINE LEARNING

CROSS-REFERENCE TO RELATED PATENT APPLICATIONS

The present application is a continuation of U.S. patent application Ser. No. 18/748,002, filed on Jun. 19, 2024, the disclosure of which is incorporated herein by reference in its entirety.

BACKGROUND

Prior to deployment to user devices, an application may undergo testing and validation to ensure that the functionality of the application properly behaves and operates as intended. When one of the design considerations of the application entails communications with a server hosting resources for the application, the exchanges of message and responses between the application and the server may also be tested and validated over some span of time. The testing may involve evaluation of the behavior and functionality of the application, including the interactivity provided by the application to the user. The validation may include assessing whether the application satisfies the specified requirements and purpose, such as successful communication of the message and responses.

One of the technical challenges with the testing and validation may be due to the complexity in the sequence dependency of the functionalities of the application as well as the communication of messages and responses, especially over long spans of time. These issues with testing and validation may be exacerbated depending on the types of applications and messages and responses to be exchanged over the network. For example, with digital therapeutic applications, the span of time over which the functionalities and the communications of the messages and responses involved may be on the order of weeks and months. The digital therapeutic application may directly deliver evidence-based therapy interventions (e.g., in the form of content and messages), with the objective of treating, ameliorating, or otherwise addressing a condition of the user over this span in time. Furthermore, the therapy interventions themselves may be complex, including a myriad of sequences, branches, or dynamic variation in application functionality and communications of messages and responses between the application and server.

Because of this complexity, it may be impractical and difficult to test and validate in real time all the functionalities as well as every potential sequences of messages and responses communicated between the application and server. As a result, it may be hard to pinpoint factors yielding reduced performance in the application or the communications and to determine how to optimize performance of the overall system. The inability to test and validate in real time all functionalities and potential sequences may lead to suboptimal performance of the application and the server, leading to wasted consumption of computing resources (e.g., processor, memory, and network bandwidth). Furthermore, some of the functionalities and communications that were not tested or validated may not properly operate, resulting in a decrease in the overall functionality of the system. The malfunction of the application may also lead to reduction in quality of human-computer interactions (HCI) between the user and the application.

With digital therapeutic applications, the testing and validating all the functionalities and every sequence of messages and responses may entail waiting for a significant amount of time (e.g., several weeks or months) until the end of the therapeutic intervention. This may ultimately delay the deployment of digital therapeutic application, sometimes at an even greater timeframe. Releasing the digital therapeutic application prior to a complete testing and validation may also result in some of the functionalities and communications not properly operating, as well as suboptimal performance of the overall system (e.g., the digital therapeutic application and server). In addition, the breakdown of functionalities and communications during runtime may lead to a degradation in the quality of HCI between the user and application. In the context of digital therapeutics, the application may also become ineffective at addressing the condition or even worsen the condition associated with the user.

SUMMARY

Presented herein are systems and methods for simulating testing environments for applications over spans of time. To solve these and other technical challenges, a test management service may automatically vary clock time advancement for a digital therapeutic application to trigger communication of messages. The test management service may maintain and manipulate a central clock, and may inject precise timestamps from the central clock to the respective clocks on the application and the server. There may be several advantages and benefits from automatically varying clock times in this manner when testing and validating digital therapeutic applications. For one, by advancing the system clocks on the server and the application using the centralized clock, the test management service may shorten the testing and validation of the triggers for the digital therapeutic application from the scale of weeks and months to minutes or hours. For example, testing and validation that would have taken as long as thirty to ninety days without automated clock advancement may instead take as little as ten to thirty minutes. This can free up time and effort that would have otherwise been spent on waiting around for the completion of testing and validation to optimizing and improving the efficiency and the functionality of the digital therapeutic application as well as the content for the messages. Not to mention, this shortened testing and validation period may allow for much quicker roll-out and deployment of the digital therapeutic application to users.

For another, given the shorter amount of time to test and validate, the test management service may be able to test and validate more aspects of the digital therapeutic application. This may ensure that more functionalities of the digital therapeutic application operate as intended and designed, and more of the messages (in accordance with sequences, branches, or dynamic variation) are properly communicated. In doing so, computing resources (e.g., processing and memory) and network bandwidth that would have been wasted in improper functioning or incorrect communications may be conserved. Furthermore, technical issues apparent to the user (e.g., with the presentation of content) may be resolved before deployment, thereby improving the quality of HCI between the user and the digital therapeutic content. From the perspective of the therapy provided, the test management service may better ensure that the digital therapeutic application is more effective at ameliorating, treating, or otherwise addressing the condition of the user.

To that end, the automatic variation of clock time advancement may leverage the nature of digital therapeutic applications. The delivery of therapy interventions in the form of messages may depend on triggers defined in terms of a time schedule (e.g., defined in hours, minutes, seconds, days, and months), among other factors and conditions. For example, upon passage of a time for a particular message, the server may be triggered to send the message containing the digital therapeutic content to the application on the computing device. The challenge here in testing may be that the time on the application and the server may elapse per the system clocks on the computing system and server. The test management service may be configured with a centralized clock defining a time at which the clocks on the server and the application (e.g., in a virtual test environment) are to be set. By systematically advancing the system clocks on the server and the application using the centralized clock, the server may be triggered to transmit these messages at an earlier point in time relative to the actual time.

The test management service may identify a set of triggers for communications of messages and responses defined by an event scheduler for the digital therapeutic application. The set of triggers may be fixed or predefined for the digital therapeutic application or may be dynamically generated during runtime (e.g., by artificial intelligence or machine learning model) based on various inputs (e.g., user profile or prior responses) for a set span of time (e.g., 1 week to 6 months). Each trigger may specify a timestamp defining a time at which the server is to transmit a specified message containing the digital therapeutic content. From each trigger, the test management service may identify a timestamp specified by the trigger, and may set the centralized clock to the identified timestamp. By being set in this manner, the centralized clock may skip over or fast forward hours, days, weeks, or months of actual time in less than a fraction of a second. The setting of the centralized clock may cause (e.g., via communicated instructions or injection) the clocks of the application and the server to be also overridden and set to the timestamp. Consequently, the clocks on the application and the server may be synchronized with the centralized clock on the test management service.

With the setting of the clocks, the server may determine whether the trigger corresponding to the timestamp is invoked. The determination may be performed by the server in accordance with a time interval (e.g., between every 30 seconds to 1 hour) or on-demand for evaluating whether to send messages. For instance, every 5 minutes, the server may use data associated with the computing device or the user to check against the criterion of the trigger. When the criterion is not satisfied and consequently the trigger is determined to be not invoked, the server may refrain from transmission of the message. Conversely, when the criterion is satisfied and the trigger is determined to be invoked, the server may select the specified message and transmit the message to the computing device for presentation via the digital therapeutic application. Upon presentation of the message, the application may monitor for user interactions (e.g., actions performed in furtherance of addressing the condition) with the user interface elements of the message. Using the data associated with the user interactions, the application may generate a response and transmit the response to the server.

In conjunction, the test management service may monitor for communications between the computing device and the server. From monitoring, the test management service may identify whether the message for addressing the condition to the user is communicated between the server and the computing device, as specified by the trigger. The monitoring for the specific message for the trigger may be performed over the time interval used by the server (e.g., between 30 seconds to 1 hour). Based on the trigger and the communication of the message or the response, the testing management service may determine whether the associated trigger is validated or not validated. When the trigger is determined to be not invoked and the message is identified as not transmitted, the testing management service may determine that the trigger is validated. When the trigger is determined to be invoked and the message is identified as transmitted, the testing management service may determine that the trigger is validated. Conversely, when the trigger is determined to be invoked and the message is identified as not transmitted, the testing management service may determine that the trigger is not validated. When the trigger is determined to be invoked and the message is identified as transmitted, the testing management service may determine that the trigger is not validated.

The test management service may repeat this over the set of triggers over the set span of time as specified by the event scheduler. The test management service may use the responses from the digital therapeutic application as part of the validation process. If any of the triggers is determined as not validated by the end of the span of time, the test management service may determine that the event scheduler is not validated. Conversely, if all of the triggers are determined as validated by the end of the span of time, the test management service may determine that the event scheduler is validated. The test management service may generate an output based on the results on the validation for presentation to the administrator of the digital therapeutic application or the server hosting resources for the application.

By advancing the system clocks on the server and the application using the centralized clock, the test management service may significantly shorten the testing and validation of the triggers for the digital therapeutic application from the scale of weeks and months to minutes or hours. The test management service may thus increase the likelihood that the functionalities of the digital therapeutic application and the communications between the application and the server are properly functioning during runtime, relative to approaches without reliance of time clock advancement. The functionalities of the digital therapeutic application and the communications between the application and the server may be optimized and improved, thereby saving computing resources (e.g., processing and memory) and network bandwidth that would have otherwise been wasted in an improperly functioning application. In the context of digital therapeutics, the test management service may better ensure that the application is more effective addressing the condition of the user.

Aspects of the present disclosure are directed to systems and methods for simulating testing environments for digital therapeutic applications to address conditions over spans of time. One or more processors can select a trigger of an event scheduler, the trigger identifying a respective timestamp to communicate corresponding content. The trigger can identify a respective timestamp of a plurality of timestamps at which a service is to communicate corresponding content. The one or more processors can update a clock on at least one of a service or a user device. The one or more processors can identify the corresponding content is communicated between the service and the user device in accordance with the trigger. The one or more processors can identify the corresponding content responsive to the clock corresponding to the respective timestamp of the trigger. The one or more processors can determine the trigger of the event scheduler is validated, and the one or more processors can determine the trigger is validated responsive to identifying the corresponding content is communicated.

In some embodiments, the one or more processors can select a second trigger responsive to determining the trigger is validated. The second trigger can identify a second timestamp corresponding to an end of a time period. The one or more processors can modify the clock on at least one of the service or the user device to advance in time over a second current time. The one or more processors can cause at least one of the service or the user device to communicate a second content, responsive to the clock corresponding to the second timestamp of the trigger. The one or more processors can identify the second content is communicated between the service and the user device in accordance with the second trigger. The one or more processors can determine the event scheduler is validated in advance of the end of the time period, responsive to identifying the second content is communicated between the service and the user device.

In some embodiments, selecting a trigger can include selecting a trigger from a plurality of triggers, and determining the event schedule is validated can include determining the event scheduler is validated, responsive to identifying the service successfully transmitted the corresponding content for each trigger of the plurality of triggers to the user device.

In some embodiments, the one or more processors can modify the clock on at least one of the service or the user device over a second timestamp of a second trigger. The one or more processors can cause at least one of the service or the user device to communicate a second content, responsive to the clock corresponding to the second timestamp of the second trigger. The one or more processors can determine the second trigger of the event scheduler is not validated, responsive to identifying a lack of communication of the second content.

In some embodiments, the one or more processors can re-cause at least one of the service or the user device to communicate the second content to the user device for a second attempt, responsive to identifying the lack of the communication of the second content in a first attempt.

In some embodiments, the one or more processors can retrieve a transaction log identifying one or more of a plurality of content communicated between the service and the user device, responsive to determining the second trigger is not validated. The one or more processors can generate an output to include at least one of an indication of a failure to validate the second trigger and an identification of the transaction log.

In some embodiments, the one or more processors can cause, using a reference clock accessible to at least one of the service or the user device, at least one of (i) the service to set a service clock corresponding to the clock from a first timestamp to the respective timestamp or (ii) the user device to set a device clock corresponding to the clock from a second timestamp to the respective timestamp.

In some embodiments, the event scheduler can include a machine learning model to generate at least a portion of a plurality of triggers for the event scheduler.

In some embodiments, the trigger is from a plurality of triggers, at least one of the plurality of triggers further identifying a respective criterion to satisfy for at least one of the service or the user device to communicate the corresponding content, and cause at causing at least one of the service or the user device to communicate the corresponding content further includes causing at least one of the service or the user device to communicate the corresponding content, responsive to data associated with the user device satisfying the respective criterion identified by the trigger In some embodiments, modifying the clock can include modifying the clock on at least one of the service or the user device from an initial timestamp corresponding to a current time to the respective timestamp corresponding to a subsequent time identified by the trigger, in advance of an occurrence of the subsequent time.

In some embodiments, identifying the corresponding content is communicated further can include at least one of: (i) identifying the service transmitted the corresponding content using a transmission log associated with the service, (ii) identifying the user device received the corresponding content from the service using a receipt log associated with the user device, or (iii) identifying the service received a response from the user device within a time window relative to transmitting the corresponding content.

In some embodiments, the corresponding content includes at least one of a short message service (SMS) message, a multimedia messaging service (MMS), or an in-app content, wherein the corresponding content is to be presented to a user, at least in partial concurrence with the user being on a medication to address a condition of the user.

In some embodiments, modifying the clock on at least one of the service or the user device to advance in time over a current time can include increasing a speed of the clock on at least one of the service or the user device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
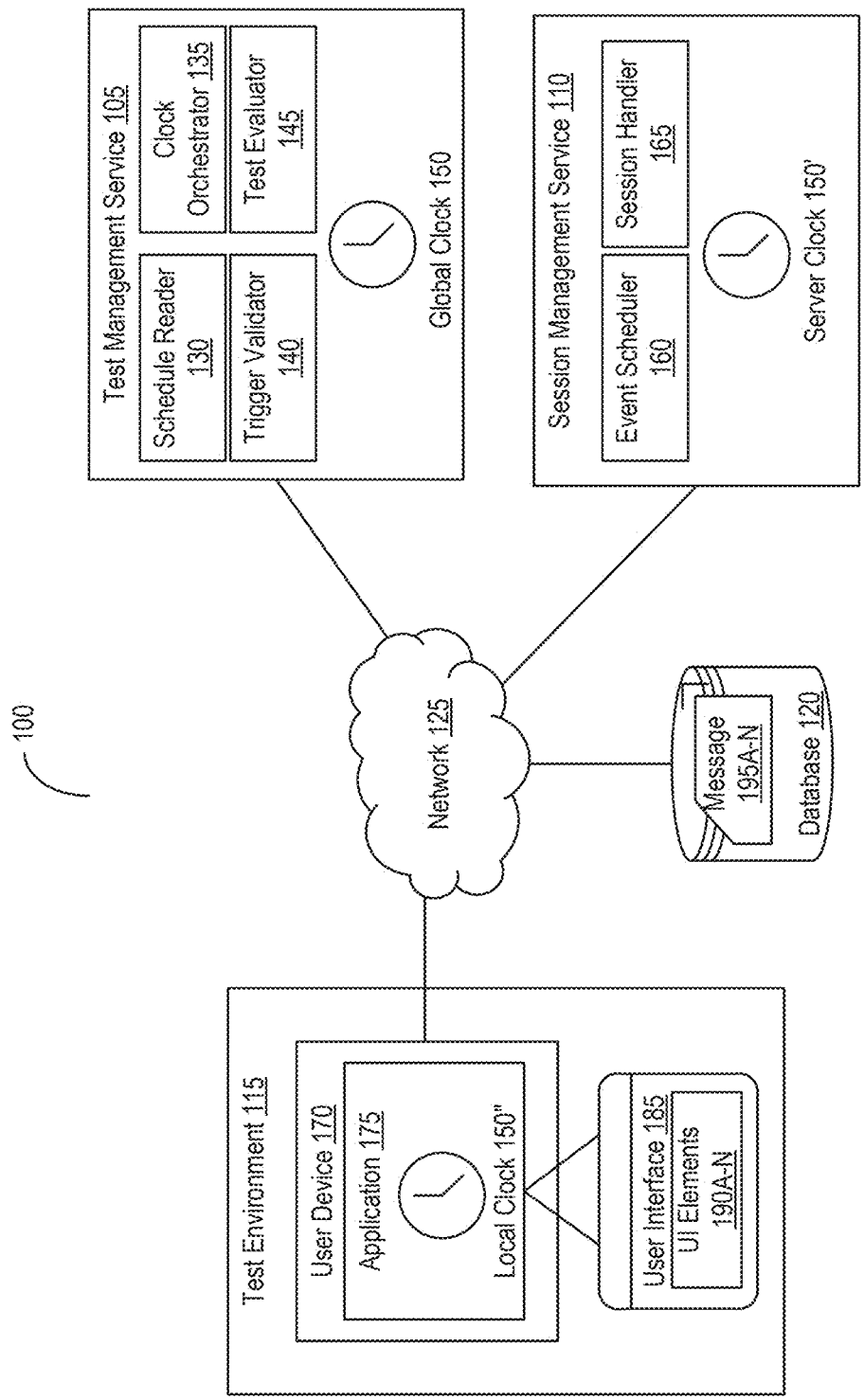
FIG. 1 depicts a block diagram of a system for simulating testing environments for digital therapeutic applications to address conditions over spans of time, in accordance with an illustrative embodiment.

For purposes of reading the description of the various embodiments below, the following enumeration of the sections of the specification and their respective contents may be helpful:

Section A describes systems and methods for simulating testing environments for applications over spans of time; and Section B describes a network and computing environment which may be useful for practicing embodiments described herein.

a. Systems and Methods for Simulating Testing Environments for Applications Over Spans of Time Referring now to FIG. 1, depicted is a block diagram of an environment or system 100 for simulating testing environments for applications over spans of time. In brief overview, the system 100 may include at least one test management service 105, at least one session management service 110, at least one test environment 115, and at least one database 120, communicatively coupled with one another via at least one network 125. The test management service 105 may include at least one schedule reader 130, at least one clock orchestrator 135, at least one trigger validator 140, at least one test evaluator 145, and at least one global clock 150, among others. The session management service 110 may include at least one event scheduler 160, at least one session handler 165, and at least one server clock 150', among others. The test environment 115 may include at least one user device 170, among others. The user device 170 may include at least one application 175 with at least one local clock 150". The application 175 may provide or include at least one user interface 185. The user interface 185 may include one or more user interface (UI) elements 190A-N (hereinafter generally referred to as UI elements 190). The database 120 may include a set of messages 195A-N (hereinafter generally referred to as messages 195). Each of the components of the system 100 (e.g., the test management service 105, the session management service 110, the test environment 115, and the user device 170) can be implemented using the computing system as described in Section B.

In further detail, the test management service 105 (sometimes herein generally referred to as a service or a testing service) may be any computing device comprising one or more processors coupled with memory and software and capable of performing the various processes and tasks described herein. The test management service 105 may be associated with an entity overseeing or managing testing, verification, and validation of the application 175 or the session management service 110, among others. The test management service 105 may be in communication with the session management service 110, the test environment 115 including the user device 170, and the database 120, among others. The test management service 105 may be situated, located, or otherwise associated with at least one server group. The server group may correspond to a data center, a branch office, or a site at which one or more servers corresponding to the test management service 105 is situated. In some embodiments, the test management service 105 may be separate from the session management service 110 (e.g., as depicted). For example, the test management service 105 may correspond to a computing device of an administrator. In some embodiments, the test management service 105 may be a part of the session management service 110 and can execute all the functionalities ascribed to the session management service 110.

On the test management service 105, the schedule reader 130 may interface with the session management service 110 to retrieve triggers defined by the event scheduler 160 to communicate messages with the application 175. The clock orchestrator 135 may modify or set the global clock 150 in accordance with the time specified by the triggers. The trigger validator 140 may determine whether messages are communicated between the session management service 110 and the application 175 to validate the triggers. The test evaluator 145 may generate an output based on the validation of the triggers. The global clock 150 may keep track of a time for the test management service 105. The time may be defined in terms of year, month, day, hour, minute, second, and millisecond, among other units. The global clock 150 may be a hardware clock (e.g., a real-time clock, system timer, or a process clock) or a software clock (e.g., a virtual clock), among others. The global clock 150 may be accessible by the session management service 110 and the user device 170 including the application 175. The global clock 150 may function or serve as the reference clock to which the server clock 150' and the local clock 150" are to be synchronized.

The session management service 110 (sometimes herein generally referred to as a service or a messaging service) may be any computing device comprising one or more processors coupled with memory and software and capable of performing the various processes and tasks described herein. The session management service 110 may be associated with an entity administering provision of resources and content for the application 175 or delivery of the digital therapeutic to the user of the user device 170. In some embodiments, the session management service 110 may be associated with the same entity overseeing or managing testing, verification, and validation of the application 175 or the session management service 110, among others. The session management service 110 may be in communication with the test management service 105, the test environment 115 including the user device 170, and the database 120, among others. The session management service 110 may be situated, located, or otherwise associated with at least one server group. The server group may correspond to a data center, a branch office, or a site at which one or more servers corresponding to the session management service 110 is situated. In some embodiments, the session management service 110 may be separate from the test management service 105 (e.g., as depicted). In some embodiments, the session management service 110 may be part of the test management service 105, and can execute all the functionalities ascribed to the test management service 105.

On the session management service 110, the event scheduler 160 may maintain a set of triggers at which one or more of the messages 195 are to be sent to the user device 170 and presented via the application 175. The session handler 165 may manage sessions with the application 175 in which one or more of the messages 195 and responses are to be communicated in accordance with the triggers. The server clock 150' may keep track of a time for the session management service 110. The time may be defined in terms of year, month, day, hour, minute, second, and millisecond, among other units. The server clock 150' may be a hardware clock (e.g., a real-time clock, system timer, or a process clock) or a software clock (e.g., a virtual clock), among others. The server clock 150' may be synchronized with the global clock 150 on the test management service 105.

The test environment 115 may correspond to or include an environment in which to test, verify, validate, or otherwise evaluate the application 175 on the user device 170. In some embodiments, the test environment 115 may be created, instantiated, or otherwise generated by the test management service 105 for facilitating evaluation of the application 175 on the user device 170. For example, the test environment 115 may be an isolated, controlled, sandbox environment or a secure container to facilitate testing of the application 175 on the user device 170. In some embodiments, the test environment 115 may include the session management service 110 together with the user device 170 to facilitate evaluation of the application 175 on the user device 170 and the session management service 110.

The user device 170 (sometimes herein referred to as an end user computing device) may be any computing device comprising one or more processors coupled with memory and software and capable of performing the various processes and tasks described herein. The user device 170 may be in communication with the test management service 105, the test environment 115, and the database 120, among others. The user device 170 may be used to access the application 175. In some embodiments, the application 175 may be downloaded and installed on the user device 170 (e.g., via a digital distribution platform). In some embodiments, the application 175 may be a web application with resources accessible via the network 125.

In some embodiments, the user device 170 may correspond to a virtual machine running on a hardware. For example, the user device 170 may be a virtual machine with an operation system and the application 175 executing on a physical computing device such as a server and may be managed by a hypervisor. The virtual machine may be part of the isolated, controlled sandbox environment corresponding to the test environment 115. In some embodiments, the user device 170 may be a physical device. For instance, the user device 170 may be a smartphone, other mobile phone, tablet computer, wearable computing device (e.g., smart watch, eyeglasses), or laptop computer.

The application 175 executing on the user device 170 may be a digital therapeutics application. The application 175 may present or provide a session (sometimes referred to herein as a therapy session) to address at least one condition in the user. The condition of the end user may include, for example, chronic pain (e.g., associated with or including arthritis, migraine, fibromyalgia, back pain, Lyme disease, endometriosis, repetitive stress injuries, irritable bowel syndrome, inflammatory bowel disease, and cancer pain), a skin pathology (e.g., atopic dermatitis, psoriasis, dermatillomania, and eczema), a cognitive impairment (e.g., mild cognitive impairment (MCI), Alzheimer's, multiple sclerosis, and schizophrenia), a mental condition (e.g., an affective disorder, bipolar disorder, obsessive-compulsive disorder, borderline personality disorder, and attention deficit/hyperactivity disorder), a substance use disorder (e.g., opioid use disorder, alcohol use disorder, tobacco use disorder, or hallucinogen disorder), and other conditions (e.g., narcolepsy and oncology or cancer), among others.

The end user may be on a medication to address the condition, in at least partial concurrence with the use of the application 175 (e.g., for any number of sessions). For instance, if the medication is for pain, the end user may be taking acetaminophen, a nonsteroidal anti-inflammatory composition, an antidepressant, an anticonvulsant, or other composition, among others. For skin pathologies, the end user may be taking a steroid, antihistamine, or topic antiseptic, among others. For cognitive impairments, the end user may be taking cholinesterase inhibitors or memantine, among others. For a mental condition, the end user may be taking antidepressants, mood stabilizers, antipsychotics, anxiolytics, or stimulants, among others. For substance abuse disorders, the end user may be taking a naltrexone, disulfiram, acamprosate, or nicotine replacement therapy, among others. The end user may also participate in other psychotherapies for these conditions. In some embodiments, the digital therapeutic content may be provided to the end user within the digital therapeutics application towards achieving an endpoint of the end user. An endpoint can be, for example, a physical or behavioral goal of an end user, a completion of a medication regimen, or an endpoint indicated by a doctor or an end user. At least one of the end user devices 170 may have a digital therapeutics application and may provide a session (sometimes referred to herein as a therapy session) to address at least one condition of the end user.

The application 175 can include, present, or otherwise provide at least one user interface 185 including the one or more user interface elements 190A-N (hereinafter generally referred to as UI elements 190) to a user of the user device 170. The user interface 185 may be provided in accordance with a configuration on the application 175. The UI elements 190 may correspond to visual components of the user interface 185, such as a command button, a text box, a check box, a radio button, a menu item, and a slider, among others. In some embodiments, the application 175 may be a digital therapeutics application and may provide a session (sometimes referred to herein as a therapy session) via the user interface 185 to address the condition. The user interface 185 may include the set of UI elements 190 to present digital therapeutic content. In some embodiments, the application 175 may include functionalities ascribed herein to the session management service 110, such as the event scheduler 160 and the session handler 165, among others. While the application 175 is described primarily herein as a digital therapeutic application, the application 175 can include other types of applications, such as a messaging application, a word processor, a spreadsheet program, an email agent, a web browser, a video game, a database management software, or a computer-aided design software, among others.

The database 120 may store and maintain various resources and data associated with the test management service 105, the session management service 110, and the application 175, among others. The database 120 may include a database management system (DBMS) to arrange and organize the data maintained thereon, such as instances of data elements, among others. The database 120 may be in communication with the test management service 105, the session management service 110, and the application 175 via the network 125. While running various operations, the test management service 105, the session management service 110, and the application 175 may each access the database 120 to transmit and retrieve identified data therefrom. The test management service 105, the session management service 110, and the application 175 may also write data onto the databases 120 from running such operations.

The database 120 may store and maintain the set of messages 195 for addressing the condition of the user of the application 175. Each message 195 may include digital therapeutic content. The messages 195 may be transmitted, sent, or otherwise provided by the session management service 110 to the user device 170 for presentation. The messages 195 itself may be in any format. In some embodiments, at least one message 195 may be a short message/messaging service (SMS) message. The SMS message may include a text of a set length (e.g., limit to number of alphanumeric characters) to be transmitted over cellular networks. In some embodiments, at least one message 195 may be a multimedia messaging service (MMS) message. The MMS message may include multimedia content, such as text, images, video, or audio, among others. In some embodiments, at least one message 195 may be an in-app message. The in-app message may include instructions to present multimedia content (e.g., in the form of text, images, video, or audio content or any combination thereof) via UI elements 190 of the user interface 185 of the application 175. The instruction may identify or specify one or more UI elements 190 to be render, displayed, or otherwise presented within the user interface 185 of the application 175.

The digital therapeutic content of the message 195 may be in any modality, such as text, image, audio, video, or multimedia content, among others, or any combination thereof. The messages 195 can be stored and maintained in the database 120 using one or more files. For instance, for text, the digital therapeutic content can be stored as text files (TXT), rich text files (RTF), extensible markup language (XML), and hypertext markup language (HTML), among others. For an image, the digital therapeutic content may be stored as a joint photographic experts' group (JPEG) format, a portable network graphics (PNG) format, a graphics interchange format (GIF), or scalable vector graphics (SVG) format, among others. For audio, the digital therapeutic content can be stored as a waveform audio file (WAV), motion pictures expert group formats (e.g., MP3 and MP4), and Ogg Vorbis (OGG) format, among others. For video, the digital therapeutic content can be stored as a motion pictures expert group formats (e.g., MP3 and MP4), QuickTime movie (MOV), and Windows Movie Video (WMV), among others. For multimedia content, the digital therapeutic content can be an audio video interleave (AVI), motion pictures expert group formats (e.g., MP3 and MP4), QuickTime movie (MOV), and Windows Movie Video (WMV), among others.

In some embodiments, the digital therapeutic content of the message 195 may include a set of stimuli (e.g., in the form of audio, visual, or text) for the user to conduct a particular task. The task may include, for example, an implicit association task (IAT) (e.g., associating stimuli with concepts); an attention bias modification training (ABMT) (e.g., training users to shift attention away from certain stimuli); an emotional faces memory task (EFMT) (e.g., testing users to recognize and remember certain facial emotions); digital support tool (DST) (e.g., providing messages based on state of user); and adaptive goal setting (AGS) (e.g., providing messages based on dynamic objectives for user); among others. Although the messages 195 are described herein in terms of digital therapeutic content, the messages 195 can include other types of content.

Figure 2:
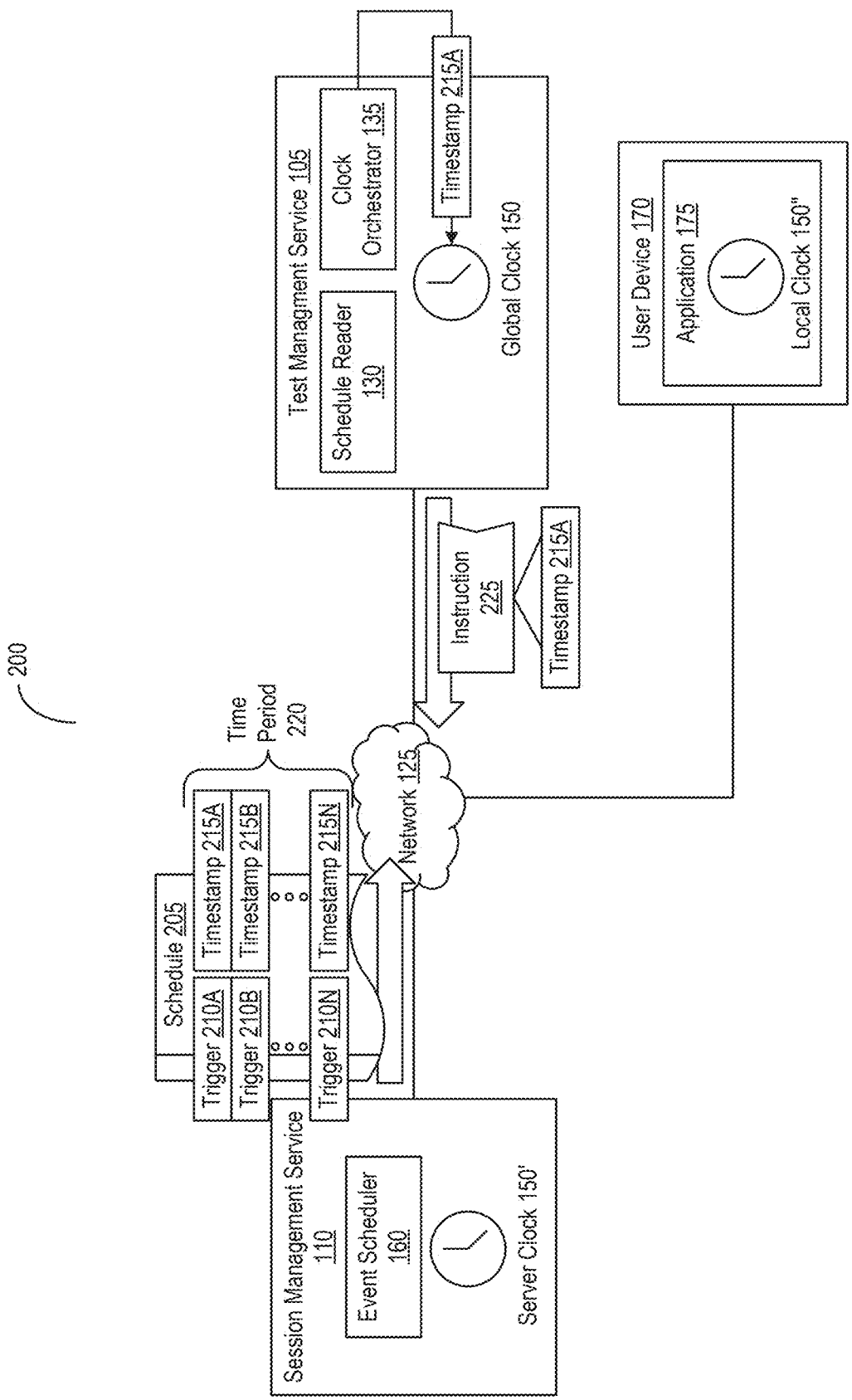
FIG. 2 depicts a block diagram of a process for retrieving event schedule data and modifying global clocks in the system for simulating testing environments, in accordance with an illustrative embodiment.

Referring now to FIG. 2, among others, depicted is a block diagram of a process 200 for retrieving event schedule data and modifying global clocks in the system 100 for simulating testing environments. The process 200 may include or correspond to operations performed in the system 100 to identify triggers and set the clocks according to triggers. Under the process 200, the event scheduler 160 executing on the session management service 110 may create, produce, or otherwise generate at least one schedule 205 for sending and presenting messages 190 to the application 175 to address the condition (e.g., of a potential user). The schedule 205 may define, identify, or otherwise include a set of triggers 210A-N (hereinafter generally referred to as triggers 210) and a corresponding set of timestamps 215A-N (hereinafter generally referred to as timestamps 215). In some embodiments, the schedule 205 may define, specify, or identify a sequence of the set of triggers 210. The sequence may include or identify one or more branches among the set of triggers 210. For example, the sequence for the schedule 205 may specify that the trigger 210B is to be evaluated, upon satisfaction and invocation of the trigger 210A. Conversely, the sequence for the schedule 205 may specify that the trigger 210C is to be evaluated, upon failure to satisfy the trigger 210A.

Each trigger 210 may define, specify, or otherwise identify a respective timestamp 215 at which the session management service 110 is to send, provide, or otherwise transmit at least one corresponding message 195 to the user device 170 for addressing the condition. Each timestamp 215 may define, specify, or otherwise identify a time at which to transmit the corresponding message 195. The timestamp 215 may be defined in terms of year, month, day, hour, minute, second, and millisecond, among other units. The set of timestamps 215 may span over at least one time period 220. The time period 220 may range between, for example, 5 days to 6 months. The time period 220 may correspond to the duration of time over which the digital therapeutic is to be delivered (e.g., in the form of messages 195). In some embodiments, the time period may correspond to or may be defined by the session management service 110 for the application 175. In some embodiments, the time period may correspond to or may be defined in terms of a duration of time between the first timestamp 215A and the last timestamp 215N in the schedule 205.

In some embodiments, at least one of the set of triggers 210 may define, specify, or otherwise identify at least one corresponding criterion to satisfy for the session management service 110 to transmit the corresponding message 195. The criterion may specify, define, or otherwise identify one or more conditions for the data associated with the user device 170 (or the application 175 running on the user device 170) to satisfy for the session management service 110 to transmit the corresponding message 195. The data may include user profile information, interaction data, indication of completion of previous activities or tasks, a device type, or a location of the user device 170, among others. In some embodiments, the conditions of the criterion may be in addition to the timestamp 215. For example, the criterion of the trigger 210 may specify that the user is to have completed a prior task by the time identified by the timestamp 215 to deliver a corresponding message 195. In some embodiments, the conditions of the criterion may be an alternative to or independent of the timestamp 215. For instance, the criterion of the trigger 210 may specify that the user is to request delivery of the corresponding one or more messages 195 via the application 175, independent of the time. With the generation, the event scheduler 160 may store and maintain the schedule 205 on a storage of the session management service 110 using one or more files (e.g., extensible markup language (XML), comma-separated values (CSV) delimited text files, or a structured query language (SQL) file).

In some embodiments, the event scheduler 160 may generate the schedule 205 in a fixed manner. For instance, the event scheduler 160 may generate the schedule 205 to include the set of triggers 210 at the initialization phase of the digital therapeutic therapy intervention. The set of triggers 210 may be fixed and unmodified through the time period for the set of timestamps 215. In some embodiments, the event scheduler 160 may generate the schedule 205 in a dynamic manner, as additional data (e.g., user profile information or user interaction data) is received from the user device 170 (or the application 175). For example, the event scheduler 160 may update or modify at least a portion the set of triggers 210 using data received from the user device 170 during the time period over which the digital therapeutic is delivered (e.g., in the form of messages 195). The event scheduler 160 may add new portions of triggers 210 and timestamps 215 to the schedule 205, using the new data received from the user device 170. The event scheduler 160 may continue to generate triggers 210 and the corresponding timestamps 215 during the span of the time period 220 (e.g., for the digital therapeutic). With the generation of each trigger 210 and corresponding timestamp 215 for the schedule 205, the event scheduler 160 may send, provide, or transmit the trigger 210 and corresponding timestamp 215 to the test management service 105.

In some embodiments, the event scheduler 160 may apply a machine learning (ML) model to the data to determine at least the portion of triggers 210 and a corresponding portion of timestamps 215 to generate the schedule 205 in the dynamic manner. The event scheduler 160 may include the ML model to generate the triggers 210 and corresponding portion of timestamps 215. The ML model may be of any architecture, such as an artificial neural network (ANN) (e.g., autoencoder, convolutional neural network (CNN), or transformer), a support vector machine (SVM), a clustering model (e.g., k-nearest neighbor model), a Bayesian classifier, a decision tree, or a random forest, among others. In general, the ML model may include at least one input (e.g., the data), at least one output (e.g., the schedule 205), and a set of weights relating the input to the output, among others.

Continuing on, the ML model may have been trained using a training dataset. The training dataset may include, for example, historical data (e.g., user profile information or user interaction data) associated with the user device or the application and a corresponding portion of triggers and timestamps. The weights of the ML model can be trained (e.g., by the session management service 110 or another service in accordance with supervised, unsupervised, or weakly supervised learning) to learn patterns within the training dataset. With the establishment of the ML model, the event scheduler 160 may apply the ML model to incoming data from the user device 170 (or the application 175). The event scheduler 160 may process the data in accordance with the set of weights of the ML model. From processing, the event scheduler 160 may generate the portion of triggers 210 and the timestamps 215 for the schedule 205.

The schedule reader 130 executing on the test management service 105 may retrieve, receive, or otherwise identify the schedule 205 including the set of triggers 210 and the corresponding set of timestamps 215 from the event scheduler 160. The schedule 205 may have been generated in a fixed manner or be continued to be generated in a dynamic manner. In some embodiments, the schedule reader 130 may access the event scheduler 160 to identify, obtain, or otherwise retrieve the set of triggers 210 and the corresponding set of timestamps 215. When the schedule 205 is generated in a fixed manner, the schedule reader 130 may retrieve the schedule 205 including all the set of triggers 210 and the corresponding set of timestamps 215 for the time period altogether. When the schedule 205 is generated in a dynamic manner, the schedule reader 130 may retrieve, identify, or otherwise receive the individual triggers 210 and the corresponding timestamps 215, as the individual triggers 210 and the corresponding timestamps 215 are generated and provided by the event scheduler 160.

By accessing the event scheduler 160, the schedule reader 130 may retrieve or otherwise identify the set of triggers 210 and the corresponding set of timestamps 215. In some embodiments, the schedule reader 130 may process or parse the schedule 205 to extract or identify the set of triggers 210 and the corresponding set of timestamps 215 from the schedule 205. From the set of triggers 210, the schedule reader 130 may identify or select at least one trigger 210 (e.g., the trigger 210A). In the depicted example, the trigger 210A may be the very first trigger 210 in the set of triggers 210, and may correspond to a start of the digital therapeutic intervention to be provided in the form of the corresponding messages 195 to the user device 170. The trigger 210A may also correspond to the start of a portion of the digital therapeutic intervention under testing and validation. The schedule reader 130 may select or identify the trigger 210 from the start of the digital therapeutic intervention as defined by the event scheduler 160. With the identification of the trigger 210, the schedule reader 130 may extract or identify the timestamp 215 of the trigger 210. In the illustrated example, the schedule reader 130 may identify the timestamp 215A associated with the very first trigger 210A. The timestamp 215A may correspond to a starting timepoint of the time period 220.

The clock orchestrator 135 executing on the test management service 105 may assign or set the global clock 150 to the timestamp 215 identified by the trigger 210. In the depicted example, with the selection of the first trigger 210A, the clock orchestrator 135 may assign or set the global clock 150 to the first timestamp 215A. In setting the global clock 150, the clock orchestrator 135 may change, alter, or otherwise modify the global clock 150 from an initial timestamp to the timestamp 215 (e.g., the timestamp 215A) identified by the trigger 210 (e.g., the trigger 210A). The initial timestamp may correspond to a current time (e.g., actual time). The timestamp 215 identified by the trigger 210 may correspond to a time subsequent to the current time. In this manner, the clock orchestrator 135 may modify the global clock 150 to the timestamp 215 to overwrite the current time, in advance of the actual time corresponding to the timestamp 215. Upon being set, the global clock 150 may keep track of time and increment in time from the timestamp 215.

In response to setting the global clock 150 to the timestamp 215, the clock orchestrator 135 may change, set, or otherwise modify the server clock 150' on the session management service 110 to be set to the timestamp 215 (e.g., the timestamp 215A). In addition, the clock orchestrator 135 may change, set, or otherwise modify the local clock 150" on the user device 170 (or the application 175) to be set to the timestamp 215 (e.g., the timestamp 215A). As discussed above, the global clock 150 on the test management service 105 may be accessible to the server clock 150' on the session management service 110 and the local clock 150" on the user device 170. In some embodiments, the clock orchestrator 135 may cause the server clock 150' to be set an initial time (e.g., the current time) to the timestamp 215 of the global clock 150. In some embodiments, the clock orchestrator 135 may cause the local clock 150" to be set from an initial time (e.g., the current time) to the timestamp 215 of the global clock 150.

In some embodiments, the clock orchestrator 135 may create, produce, or otherwise generate at least one instruction 225. The instruction 225 may include or identify the timestamp 215 to which the global clock 150 is set. The instruction 225 may be generated in response to the setting of the global clock 150. The instruction 225 may be to change, set, or otherwise modify other clocks (e.g., the server clock 150' and the local clock 150") to the timestamp 215 to which the global clock 150 is set (e.g., the timestamp 215A). For example, the instruction 225 may include a command to the recipient clock (e.g., the server clock 150' and the local clock 150") to synchronize the time with the timestamp 215 of the global clock 150. The instruction 225 may be generated in accordance with a network time protocol (NTP), a precision time protocol (PTP), or timestamp injection, among others. In some embodiments, the instruction 225 may include a command to the session management service 110 to evaluate the trigger 210 associated with the timestamp 215. With the generation, the clock orchestrator 135 may provide, transmit, or otherwise send the instruction 225 to the session management service 110 and the user device 170.

The session management service 110 (of the event scheduler 160 thereon) may change, set, or otherwise modify the server clock 150' from the initial timestamp to the timestamp 215. In some embodiments, the session management service 110 may interface with or access the global clock 150 on the test management service 105 to retrieve, obtain, or otherwise identify the timestamp 215 on the global clock 150. The session management service 110 may access the global clock 150 in accordance with a predefined cycle (e.g., an interval of 5 minutes to 30 minutes). With the identification, the session management service 110 may modify or set the server clock 150' to the timestamp 215. The timestamp 215 on the server clock 150' may be substantially similar (e.g., within 95%) to the timestamp 215 on the global clock 150. In some embodiments, the session management service 110 may retrieve, identify, or otherwise receive the instruction 225 from the test management service 105. With receipt, the session management service 110 may extract or identify the timestamp 215 from the instruction 225. With the identification, the session management service 110 may modify or set the server clock 150' to the timestamp 215. Upon being set, the server clock 150' may keep track of time and increment in time from the timestamp 215.

The user device 170 (or the application 175 thereon) may change, set, or otherwise modify the local clock 150" from the initial timestamp to the timestamp 215. In some embodiments, the user device 170 may interface with or access the global clock 150 on the test management service 105 to retrieve, obtain, or otherwise identify the timestamp 215 on the global clock 150. The user device 170 may access the global clock 150 in accordance with a predefined cycle (e.g., an interval of 5 minutes to 30 minutes). With the identification, the user device 170 may modify or set the local clock 150" to the timestamp 215. In some embodiments, the user device 170 may retrieve, identify, or otherwise receive the instruction 225 from the test management service 105. With receipt, the user device 170 may extract or identify the timestamp 215 from the instruction 225. The timestamp 215 on the local clock 150" may be substantially similar (e.g., within 95%) to the timestamp 215 on the global clock 150. With the identification, the user device 170 may modify or set the local clock 150" to the timestamp 215. Upon being set, the local clock 150" may keep track of time and increment in time from the timestamp 215.

Figure 3:
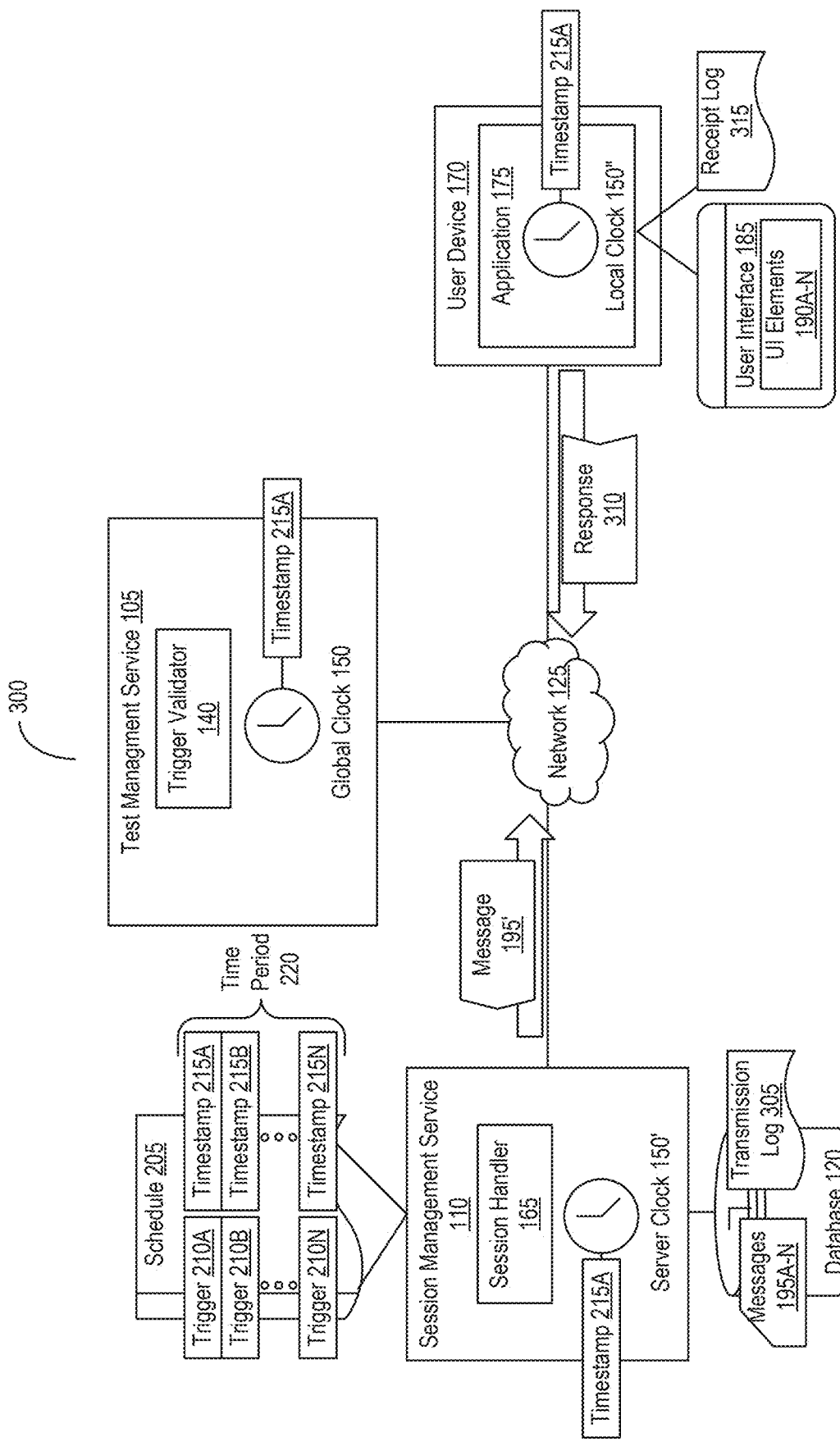
FIG. 3 depicts a block diagram of a process for validating communication of messages in the system for simulating testing environments, in accordance with an illustrative embodiment.

Referring now to FIG. 3, among others, depicted is a block diagram of a process 300 for validating communication of messages in the system 100 for simulating testing environments. The process 300 may include or correspond to operations performed in the system 100 to evaluating triggers to validate communication of messages. Under the process 300, the session handler 165 executing on the session management service 110 may identify or determine whether to provide, send, or otherwise transmit at least one message 195' to the user device 170, with the setting of the server clock 150' to the timestamp 215 (e.g., the timestamp 215A as depicted). In some embodiments, the session handler 165 may be caused by the test management service 105 to determine whether to transmit the message 195', in response to the time of the global clock 150 being set or modified to the timestamp 215. In some embodiments, the session handler 165 may be caused by the test management service 105 to evaluate the trigger 210 and determine whether to transmit the message 195' identified by the trigger 210, in response to receipt of the instruction 225. The message 195' may correspond to at least one of the set of messages 195 identified by the trigger 210. In some embodiments, the message 195' may be identified by the criterion defined by the trigger 210 as to be transmitted to the user device 170. For example, the message 195' may correspond to a message identified by the very first trigger 210A as to be transmitted to a user device 170, when the criterion is satisfied.

To determine whether to transmit, the session handler 165 may identify or determine data associated with the user device 170 satisfies the criterion defined by the trigger 210. The evaluation of whether the criterion defined by the trigger 210 is satisfied may be performed in accordance with a predefined cycle (e.g., an interval of every 30 seconds to 1 hour). The data may identify or include, for example, user profile information, interaction data, indication of completion of previous activities or tasks, a device type, or a location of the user device 170, among others. The data associated with the user device 170 may be aggregated, collected, or otherwise received from the user device 170 (or the application 175 or another device associated with the user device 170) or from the database 120. The time of the data may span up to the timestamp 215 associated with the trigger 210. For example, the session handler 165 may retrieve, identify, or otherwise receive the data to check against the criterion over a time span up to the time corresponding to the timestamp 215A as specified by the trigger 210A. In some embodiments, the data may be included as part of testing data for the test environment 115 for testing, validating, or evaluating the event scheduler 160 (or the schedule 205).

If the data associated with the user device 170 satisfies the criterion of the trigger, the session handler 165 may determine that the message 195' is to be sent to the user device 170. In some embodiments, the session handler 165 may determine that the data retrieved up to the timestamp 215 satisfies the criterion of the trigger. With this determination, the session handler 165 may determine that the message 195' is to be sent to the user device 170. When the determination is to send the message 195', the session handler 165 may identify or select the message 195' from the set of messages 195 on the database 120. The message 195' may correspond to at least one of the set of messages 195 as defined by the trigger 210. The message 195' may include, for example, a short message/messaging service (SMS) message, a multimedia messaging service (MMS) message, or an in-app message, among others. The message 195' may be presented to a user (e.g., a potential user of the user device 170 or the application 175), in partial concurrence with the user being on a medication to address the condition. In certain cases, the session management service 110 may be caused to transmit the message 195' or refrain from transmitting the message 195' in error, due to a software bug, defect in code, or soft error, among others. The behavior of the session management service 110 may be unexpected, unanticipated, or otherwise deviant from developer intentions.

With the selection, the session handler 165 may send, provide, or otherwise transmit the message 195' to the user device 170. In some embodiments, the session handler 165 may also update at least one transmission log 305 (also herein referred to as a transaction log). The transmission log 305 may include or identify a set of messages (or responses) communicated between the session management service 110 and the user device 170. The transmission log 305 may be stored and maintained on a database (e.g., local to the session management service 110 or the database 120) using one or more one or more files (e.g., extensible markup language (XML), comma-separated values (CSV) delimited text files, or a structured query language (SQL) file). The transmission log 305 may include or identify a timestamp corresponding to a time of transmission for each message. The transmission log 305 may be accessible by the test management service 105. In some embodiments, the transmission log 305 may be maintained and updated by the test management service 105. Upon transmission of the message 195', the session handler 165 may update the transmission log 305 to include an identification of the message 195' and the timestamp corresponding to the time of transmission of the message 195'.

Conversely, if the data associated with the user device 170 does not satisfy the criterion of the trigger, the session handler 165 may determine that the message 195' is not to be sent to the user device 170. In some embodiments, the session handler 165 may determine that the data retrieved up to the timestamp 215 does not satisfy the criterion of the trigger. With this determination, the session handler 165 may determine that the message 195' is not to be sent to the user device 170. When the determination is to not send any message, the session handler 165 may refrain from sending any messages associated with the trigger 210 to the user device 170. The session handler 165 may proceed to evaluate the next trigger 210 (e.g., the trigger 210B), after the time of the server clock 150' surpasses the timestamp 215 (e.g., the timestamp 215A) associated with the previous trigger 210 (e.g., the trigger 210A). The session handler 165 may send, provide, or otherwise transmit the result of the determination (e.g., to send or not to send the message 195' associated with the trigger 210 for the timestamp 215) to the test management service 105.

The user device 170 (or the application 175) may in turn retrieve, identify, or otherwise receive the message 195' from the session management service 110. With receipt, the user device 170 may display, render, or otherwise present the message 195'. When the message 195' is an SMS or MMS message, the user device 170 may use a messaging application to present the content of the message 195'. The messaging application may be, for example, the default application used by an operating system on the user device 170 to present and communicate messages in the SMS or MMS protocol. When the message 195' is an in-app message, the application 175 executing on the user device 170 may present the content of the message 195' via the UI elements 190 of the user interface 185 in accordance with the instructions of the message 195'

In some embodiments, the user device 170 may also update at least one receipt log 315 (also herein referred to as a transaction log). The receipt log 315 may include or identify a set of messages or responses communicated between the user device 170 and the session management service 110. The receipt log 315 may be stored and maintained on a database (e.g., local to the session management service 110 or the database 120) using one or more files (e.g., extensible markup language (XML), comma-separated values (CSV) delimited text files, or a structured query language (SQL) file). The receipt log 315 may include or identify a timestamp corresponding to a time of communication for each message or response. The receipt log 315 may be accessible by the test management service 105. In some embodiments, the receipt log 315 may be maintained and updated by the test management service 105. Upon receipt of the message 195', the user device 170 may update the receipt log 315 to include an identification of the receipt of the message 195' and the timestamp corresponding to the receipt of the message 195'.

Upon presentation of the message 195', the user device 170 (or the application 175) may create, produce, or otherwise generate at least one response 310. The response 310 may include an acknowledgement of receipt of the message 195' or an indication that the message 195' is presented via the user device 170. In some embodiments, the user device 170 may retrieve, obtain, or otherwise identify data associated with the presentation of the message 195'. The data may include interaction data or event data of processes on the user device 170, and may be part of the testing data for the test environment 115 for testing, validating, or evaluating the event scheduler 160 (or the schedule 205). In some embodiments, the user device 170 may generate the response 310 to include the data (e.g., user interaction or event data).

With the generation of the response 310, the user device 170 may send, provide, or otherwise transmit the response 310 to the session management service 110. Upon transmission of the response 310, the user device 170 may update the receipt log 315 to include an identification of the response 310 and the timestamp corresponding to the time of transmission of the response 310. The session handler 165 may in turn retrieve, identify, or receive the response 310 from the user device 170. Upon receipt of the response 310, the session handler 165 may update the transmission log 305 to include an identification of the response 310 and the timestamp corresponding to the time of receipt of the response 310. In addition, the session handler 165 may store and maintain the response 310 on the database 120.

In conjunction, the trigger validator 140 executing on the test management service 105 may determine or identify whether the message 195' is communicated between the session management service 110 and the user device 170 in accordance with the trigger 210. Based on whether the message 195' is communicated properly as specified by the trigger 210, the trigger validator 140 may determine whether to validate the trigger 210 associated with the timestamp 215. To identify, the trigger validator 140 may determine whether the criterion of the trigger 210 is satisfied. The trigger validator 140 may interface with or access the session handler 165 to retrieve, obtain, or otherwise identify the results of the evaluation of the trigger 210 performed by the session handler 165 on the session management service 110. In addition, the trigger validator 140 may monitor or check for the communication of the message 195' between the session management service 110 and the user device 170. In some embodiments, the trigger validator 140 may monitor or check for the communication of the response 310 from the user device 170 to the session management service 110, within a time window (e.g., 30 seconds to 1 hour) relative to the transmission of the prior message 195'. In some embodiments, the trigger validator 140 may monitor for updates on the transaction log (e.g., the transmission log 305 or the receipt log 315) of messages or responses communicated.

When the criterion of the trigger 210 is satisfied, the trigger validator 140 may determine or identify whether the message 195' is communicated between the session management service 110 and the user device 170 in accordance with the trigger 210. If the message 195' is identified as transmitted from the session management service 110 and the user device 170 (e.g., from monitoring or the transaction log), the trigger validator 140 may identify that the message 195' is communicated in accordance with the trigger 210. In some embodiments, if the response 310 in response to the message 195' is received within the time window of the message 195', the trigger validator 140 may identify that the message 195' is communicated in accordance with the trigger 210. In addition, when the message 195' is identified as communicated according to the trigger 210, the trigger validator 140 may identify or determine that the trigger 210 of the event scheduler 160 (or the schedule 205) is validated.

On the other hand, if the message 195' is not identified as transmitted from the session management service 110 and the user device 170, the trigger validator 140 may identify that the message 195' is not communicated in accordance with the trigger 210. In addition, when the message 195' is identified as not communicated as specified by the trigger 210, the trigger validator 140 may identify or determine that the trigger 210 of the event scheduler 160 (or the schedule 205) is not validated. In some embodiments, the trigger validator 140 may retry or re-cause the session management service 110 to transmit the message 195' for a second attempt, in response to identifying the lack of communication of the message 195' in accordance to the trigger 210 at a first attempt. For example, the trigger validator 140 may create, produce, or otherwise generate another instruction to indicate to the session management service 110 to re-evaluate the trigger 210. Upon receipt, the session handler 165 can re-evaluate the criterion of the trigger 210, and the system 100 may repeat the functions detailed herein for the second attempt.

Conversely, when the criterion of the trigger 210 is not satisfied, the trigger validator 140 may determine or identify whether the message 195' is not communicated between the session management service 110 and the user device 170 in accordance with the trigger 210. If the message 195' is identified as not transmitted from the session management service 110 and the user device 170 (e.g., from monitoring or the transaction log), the trigger validator 140 may identify that the message 195' is not communicated in accordance with the trigger 210. In addition, when the message 195' is identified as not communicated as specified by the trigger 210, the trigger validator 140 may identify or determine that the trigger 210 of the event scheduler 160 (or the schedule 205) is validated. On the other hand, if the message 195' is identified as transmitted from the session management service 110 and the user device 170, the trigger validator 140 may identify that the message 195' is not communicated in accordance with the trigger 210. In addition, when the message 195' is identified as communicated according to the trigger 210, the trigger validator 140 may identify or determine that the trigger 210 of the event scheduler 160 (or the schedule 205) is not validated. In some embodiments, the trigger validator 140 may terminate the testing and validation of the set of triggers 210 of the event scheduler 160 (or the scheduler 205), in response to determining that at least one trigger 210 (e.g., the trigger 210A) is not validated.

Figure 4:
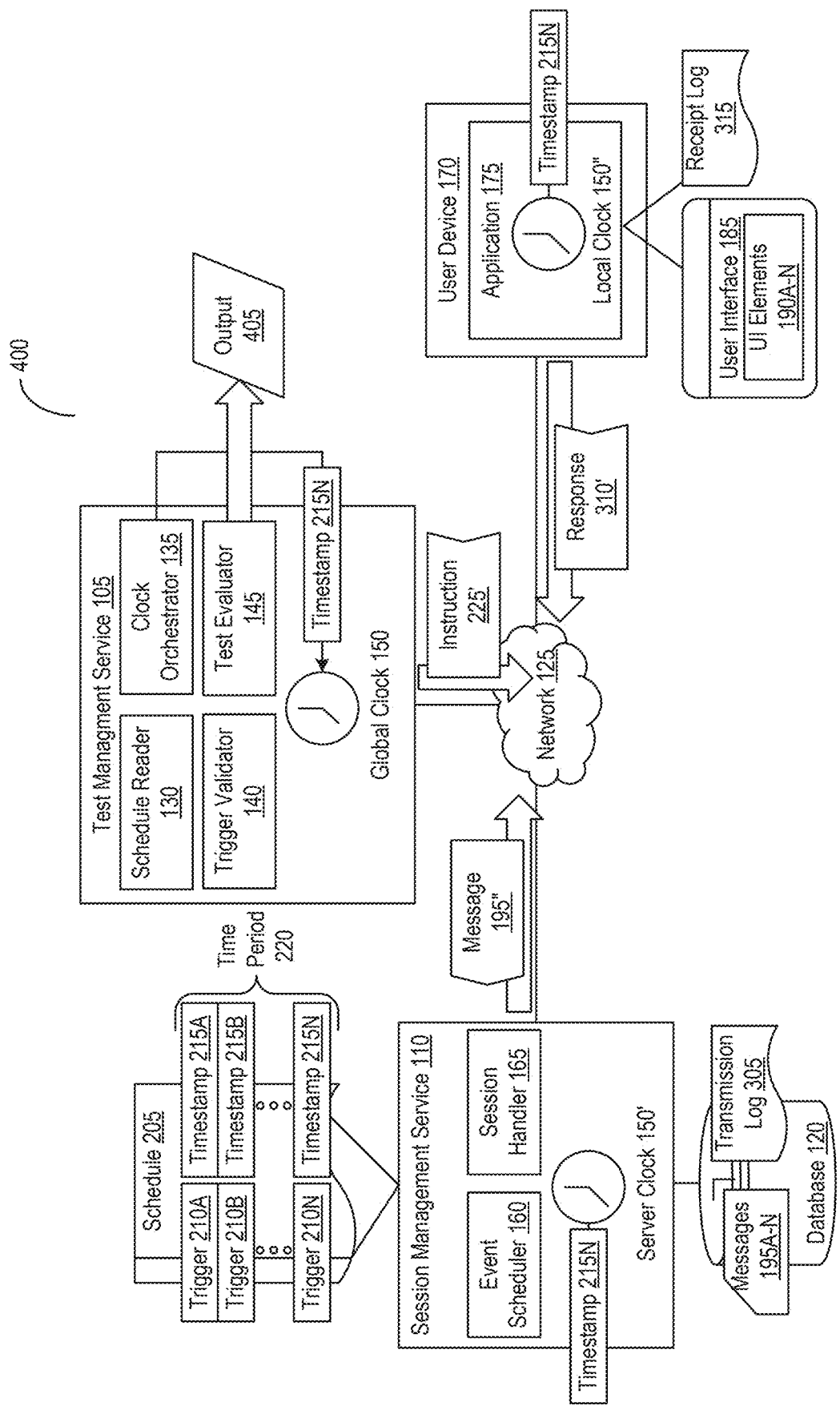
FIG. 4 depicts a block diagram of a process for remodifying global clocks and validating communications of messages in the system for simulating testing environments, in accordance with an illustrative embodiment.

Referring now to FIG. 4, depicted is a block diagram of a process 400 for remodifying global clocks and validating communications of messages in the system 100 for simulating testing environments. The process 400 may include or correspond to operations to remodify clocks according to subsequent triggers and evaluating triggers to validate communication of messages. The process 400 may overlap or be a repeat of operations of processes 200 and 300 as detailed herein, for another trigger 210 or timestamp 215. Under the process 400, the schedule reader 130 may identify or select at least one subsequent trigger 210 from the set of triggers 210 of the event scheduler 160 (or the schedule 205). The selection of the subsequent trigger 210 may be similar as selection of the previous trigger 210 (e.g., the trigger 210A) as detailed herein. In some embodiments, the schedule reader 130 may select the subsequent trigger 210, upon determining that the previous trigger 210 is validated. In some embodiments, the schedule reader 130 may select the subsequent trigger 210, independent of determining whether the previous trigger 210 is validated. In some embodiments, the subsequent trigger 210 may be identified by the previous trigger 210 as the following trigger to be evaluated in the schedule 205.

The schedule reader 130 may access the event scheduler 160 (or the schedule 205) to obtain, retrieve, or otherwise identify the subsequent trigger 210. The subsequent trigger 210 may have been generated in a fixed manner or a dynamic manner by the event scheduler 160. With the identification of the trigger 210, the schedule reader 130 may extract or identify the timestamp 215 of the trigger 210. In the depicted example, the trigger 210N may be the very last trigger 210 in the set of triggers 210, and may define the timestamp 215N corresponding to the end of the time period 220. In some embodiments, the trigger 210N may correspond to the end of the digital therapeutic intervention to be provided in the form of the corresponding messages 195 to the user device 170.

The clock orchestrator 135 may assign or set the global clock 150 to the timestamp 215 identified by the trigger 210. The setting of the global clock 150 using the timestamp 215 (e.g., the timestamp 215N) may be similar to the setting of the global clock 150 as discussed herein (e.g., with timestamp 215A). In the depicted example, with the selection of the last trigger 210N, the clock orchestrator 135 may assign or set the global clock 150 to the last timestamp 215N. In setting the global clock 150, the clock orchestrator 135 may change, alter, or otherwise modify the global clock 150 from the previously tested timestamp to the timestamp 215 (e.g., the timestamp 215N) identified by the trigger 210 (e.g., the trigger 210N). The previous timestamp may correspond to the timestamp 215 of the previous trigger 210, with some amount of incrementation since the previous evaluation of the previous trigger 210. In response to setting the global clock 150 to the timestamp 215, the clock orchestrator 135 may change, set, or otherwise modify the server clock 150' and the local clock 150" to be set to the timestamp 215 (e.g., the timestamp 215N).

In some embodiments, the clock orchestrator 135 may create, produce, or otherwise generate at least one instruction 225'. The instruction 225' may include or identify the timestamp 215 (e.g., the timestamp 215N) to which the global clock 150 is set. With the generation, the clock orchestrator 135 may provide, transmit, or otherwise send the instruction 225 to the session management service 110 and the user device 170. The session management service 110 (of the event scheduler 160 thereon) may change, set, or otherwise modify the server clock 150' from the previous timestamp to the timestamp 215. In addition, the user device 170 (or the application 175 thereon) may change, set, or otherwise modify the local clock 150" from the previous timestamp to the timestamp 215. The previous timestamp may correspond to the timestamp 215 of the previous trigger 210, with some amount of incrementation since the previous evaluation of the previous trigger 210.

The session handler 165 on the session management service 110 may identify or determine whether to provide, send, or otherwise transmit at least one message 195" to the user device 170, with the setting of the server clock 150' to the timestamp 215 (e.g., the timestamp 215N as depicted). The transmission of the message 195" may be similar to the transmission of the message 195' as discussed herein. To determine whether to transmit, the session handler 165 may identify or determine data associated with the user device 170 satisfies the criterion defined by the trigger 210. The evaluation of whether the criterion defined by the trigger 210 is satisfied may be performed in accordance with the predefined cycle. As discussed above, the data associated with the user device 170 may be aggregated, collected, or otherwise received from the user device 170 (or the application 175 or another device associated with the user device 170) or from the database 120. The time of the data may span up to the timestamp 215 associated with the trigger 210 (e.g., up to timestamp 215N).

If the data associated with the user device 170 satisfies the criterion of the trigger, the session handler 165 may determine that the message 195" is to be sent to the user device 170. In some embodiments, the session handler 165 may determine that the data retrieved up to the timestamp 215 satisfies the criterion of the trigger. With this determination, the session handler 165 may determine that the message 195" is to be sent to the user device 170. When the determination is to send the message 195", the session handler 165 may identify or select the message 195" from the set of messages 195 on the database 120. With the selection, the session handler 165 may send, provide, or otherwise transmit the message 195" to the user device 170. In some embodiments, the session handler 165 may also update the transmission log 305 to include or identify the transmission of the timestamp 215. Conversely, if the data associated with the user device 170 does not satisfy the criterion of the trigger, the session handler 165 may determine that the message 195" is not to be sent to the user device 170. In some embodiments, the session handler 165 may determine that the data retrieved up to the timestamp 215 does not satisfy the criterion of the trigger. With this determination, the session handler 165 may determine that the message 195" is not to be sent to the user device 170.

The user device 170 (or the application 175) may in turn retrieve, identify, or otherwise receive the message 195" from the session management service 110. With receipt, the user device 170 may display, render, or otherwise present the message 195". In some embodiments, the user device 170 may also update at least one receipt log 315 to include or identify the receipt of the message 195". Upon presentation of the message 195', the user device 170 (or the application 175) may create, produce, or otherwise generate at least one response 310'. The generation of the response 310' may be similar to the generation of the response 310 as discussed herein. The response 310' may include an acknowledgement of receipt of the message 195" or an indication that the message 195" is presented via the user device 170. With the generation of the response 310, the user device 170 may send, provide, or otherwise transmit the response 310 to the session management service 110. Upon transmission of the response 310, the user device 170 may update the receipt log 315 to include an identification of the response 310 and the timestamp corresponding to the time of transmission of the response 310.

The trigger validator 140 may determine or identify whether the message 195" is communicated between the session management service 110 and the user device 170 in accordance with the trigger 210. The identification and validation with respect to the message 195" may be similar with the identification and validation of the message 195' as discussed herein. Based on whether the message 195" is communicated properly as specified by the trigger 210, the trigger validator 140 may determine whether to validate the trigger 210 associated with the timestamp 215.

When the criterion of the trigger 210 is satisfied, the trigger validator 140 may determine or identify whether the message 195" is communicated between the session management service 110 and the user device 170 in accordance with the trigger 210. If the message 195" is identified as transmitted from the session management service 110 and the user device 170 (e.g., from monitoring or the transaction log), the trigger validator 140 may identify that the message 195" is communicated in accordance with the trigger 210. In some embodiments, if the response 310 in response to the message 195" is received within the time window of the message 195", the trigger validator 140 may identify that the message 195" is communicated in accordance with the trigger 210. In addition, when the message 195" is identified as communicated according to the trigger 210, the trigger validator 140 may identify or determine that the trigger 210 of the event scheduler 160 (or the schedule 205) is validated. On the other hand, if the message 195" is not identified as transmitted from the session management service 110 and the user device 170, the trigger validator 140 may identify that the message 195" is not communicated in accordance with the trigger 210. In addition, when the message 195" is identified as not communicated as specified by the trigger 210, the trigger validator 140 may identify or determine that the trigger 210 of the event scheduler 160 (or the schedule 205) is not validated.

Conversely, when the criterion of the trigger 210 is not satisfied, the trigger validator 140 may determine or identify whether the message 195" is not communicated between the session management service 110 and the user device 170 in accordance with the trigger 210. If the message 195" is identified as not transmitted from the session management service 110 and the user device 170 (e.g., from monitoring or the transaction log), the trigger validator 140 may identify that the message 195" is not communicated in accordance with the trigger 210. In addition, when the message 195" is identified as not communicated as specified by the trigger 210, the trigger validator 140 may identify or determine that the trigger 210 of the event scheduler 160 (or the schedule 205) is validated. On the other hand, if the message 195" is identified as transmitted from the session management service 110 and the user device 170, the trigger validator 140 may identify that the message 195" is not communicated in accordance with the trigger 210. In addition, when the message 195" is identified as communicated according to the trigger 210, the trigger validator 140 may identify or determine that the trigger 210 of the event scheduler 160 (or the schedule 205) is not validated.

The test evaluator 145 executing on the test management service 105 may identify or determine whether the event scheduler 160 (or the schedule 205) based on the determination of whether the triggers 210 are validated. The validation may occur in advance of the actual time corresponding to the end of the time period 220. For example, the test evaluator 145 may determine that the set of triggers 210 are all successfully validated and by extension that the event scheduler 160 (or the schedule 205) is validated within thirty minutes, although the time period 220 spans over sixty to ninety days. When the message 195 for each trigger 210 of the set of triggers 210 is identified as successfully communicated, the test evaluator 145 may identify or determine that the event scheduler 160 (or the schedule 205) is validated. In some embodiments, the test evaluator 145 may determine that the event scheduler 160 (or the schedule 205) is validated, when each trigger 210 of the set of triggers is identified as successfully validated. In some embodiments, the test evaluator 145 may identify or determine that the event scheduler 160 is validated, when the last trigger 210 (e.g., the trigger 210N) in the time span 220 is identified as successfully validated. Conversely, when the message 195 for at least one trigger 210 of the set of triggers 210 is identified as not successfully communicated, the test evaluator 145 may identify or determine that the event scheduler 160 (or the schedule 205) is not validated. In some embodiments, the test evaluator 145 may determine that the event scheduler 160 (or the schedule 205) is not validated, when at least one trigger 210 of the set of triggers is identified as not successfully validated.

Based on the results of the validation, the test evaluator 145 may create, produce, or otherwise generate at least one output 405. When the event scheduler 160 (or the schedule 205) is determined as validated, the test evaluator 145 may generate the output 405 to identify or include an indicator that the event scheduler 160 (or the schedule 205) is validated. In some embodiments, the test evaluator 145 may generate the output 405 to indicate that the set of triggers 210 are all validated. On the other hand, when the event scheduler 160 (or the schedule 205) is determined as not validated, the test evaluator 145 may generate the output 405 to identify or include an indicator that the event scheduler 160 (or the schedule 205) is not validated. In some embodiments, the test evaluator 145 may generate the output 405 to include at least one identifier corresponding to at least one trigger 210 of the set of triggers 210 that is not validated.

In some embodiments, the test evaluator 145 may use at least a portion of the transaction log (e.g., the transmission log 305 or the receipt log 315) to generate the output 405. The output 405 may be generated to include an identifier of the transaction log corresponding to at least one of the transmission log 305 or the receipt log 315. The identifier may uniquely reference the transaction log, and may include, for example, a uniform resource locator (URL). The recipient may use the identifier to access the transaction log, including the set of messages and responses communicated between the session management service 110 and the user device 170. When the event scheduler 160 (or the schedule 205) is determined as validated, the test evaluator 145 may generate the output 405 to include an indication of the event scheduler 160 (or the schedule 205) as successfully validated, along with the identifier of the transaction log. When the event scheduler 160 (or the schedule 205) is determined as not validated, the test evaluator 145 may generate the output 405 to include an indication of the event scheduler 160 (or the schedule 205) as not validated, along with the identifier of the transaction log. In some embodiments, the test evaluator 145 may generate the output 405 to include at least one identifier corresponding to at least one trigger 210 of the set of triggers 210 that is not validated, along with the identifier of the transaction log.

With the generation of the output 405, the test evaluator 145 may transmit, send, or otherwise provide the output 405. The output 405 may be provided for presentation on a display (or computing device) communicatively coupled with the test management service 105. Using the output 405, the user of the test management service 105 may view the results of the testing and validating of the event scheduler 160. If there are any triggers 210 that are not validated, the user may further inspect the contents of the output 405 to pinpoint which triggers 210 contributed to the failure to validate the event scheduler 160. Based on the output 405, the user may adjust, change, or otherwise modify the configuration (e.g., programming code or script) of the session management service 110, the user device 170, or the application 175, among others.

By using the global clock 150 to systematically set, override, and advance the times on the server clock 150' and the local clock 150'', the test management service 105 may significantly shorten and truncate the amount of time that it would have taken to test and validate the set of triggers 210 and the event scheduler 160 for the application 175. The order of time may be reduced from weeks and months (e.g., as in approaches that do not rely on the systematic clock advancement disclosed herein) to minutes and hours. The test management service 105 may thus enhance the likelihood the testing and validation process itself and may increase the number of functionalities that can be tested within a defined amount of time. Since more functions can be tested and validated, the overall capabilities of the session management service 110 and the user device 170 and the communications between the two may be immensely improved and optimized. The optimization may allow for saving of computing resources (e.g., processing and memory) on both the session management service 110 and the user device 170 as well as reduction in network bandwidth consumption. In the context of digital therapeutics, the test management service 105 may better ensure that the session management service 110 and the application 175 are more effective in addressing the condition of the user.

Figure 5A:
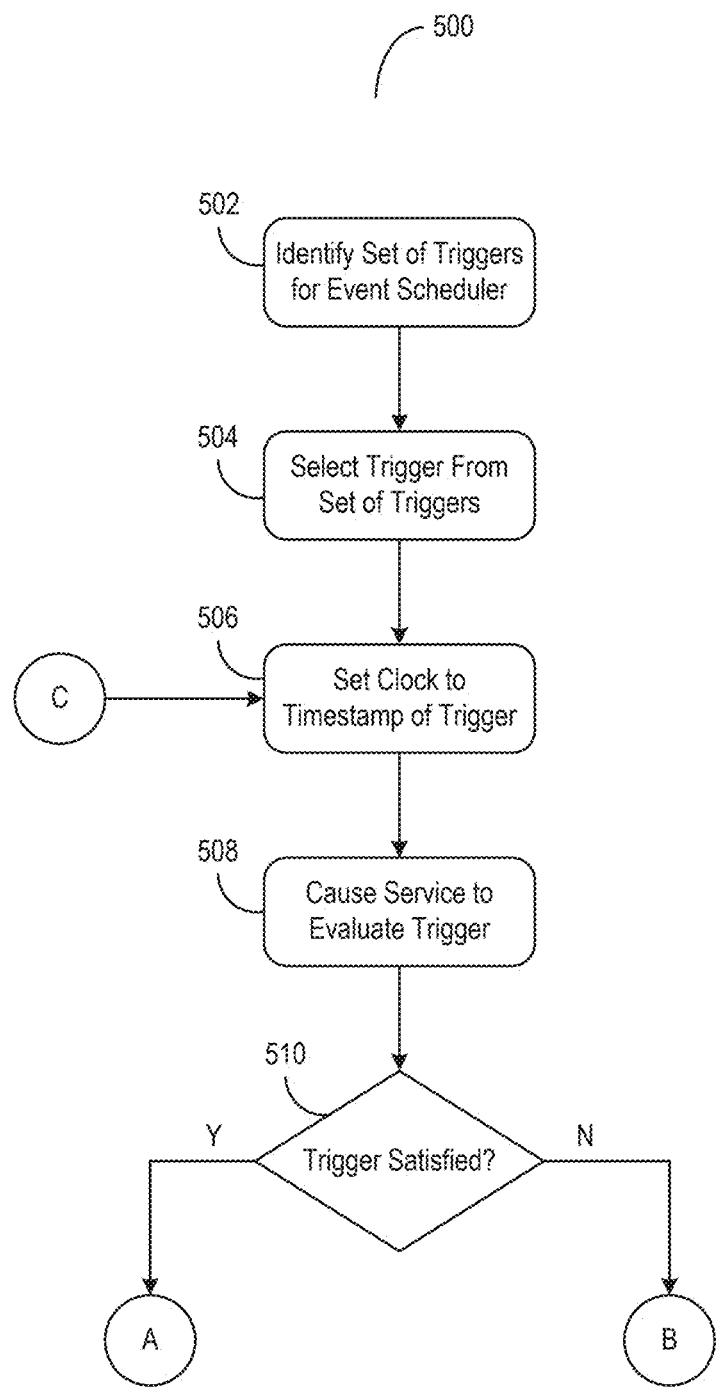
FIGS. 5A-C depicts a flow diagram of a method of simulating testing environments for digital therapeutic applications to address conditions over spans of time, in accordance with an illustrative embodiment.
Figure 5B:
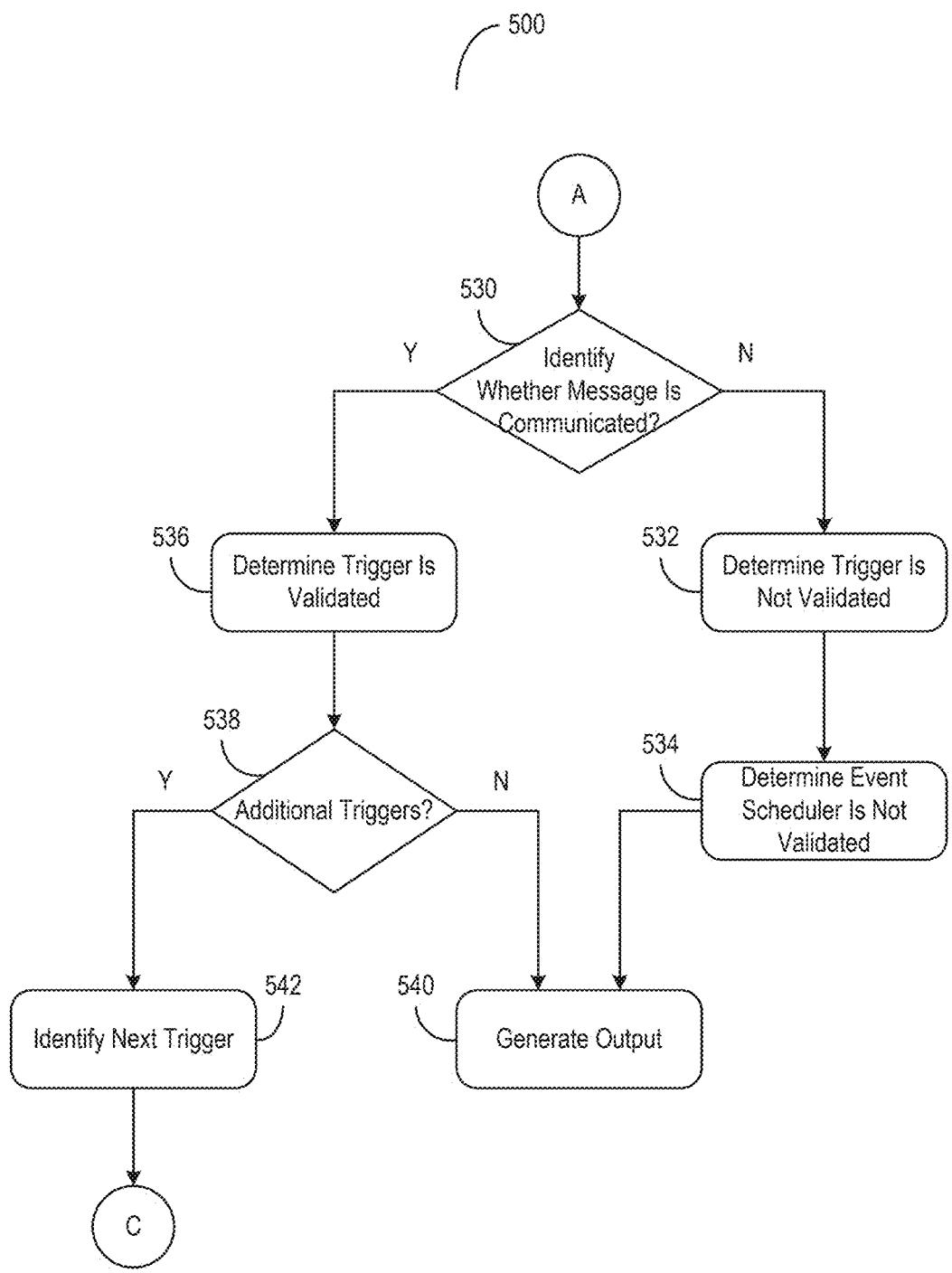
Figure 5C:
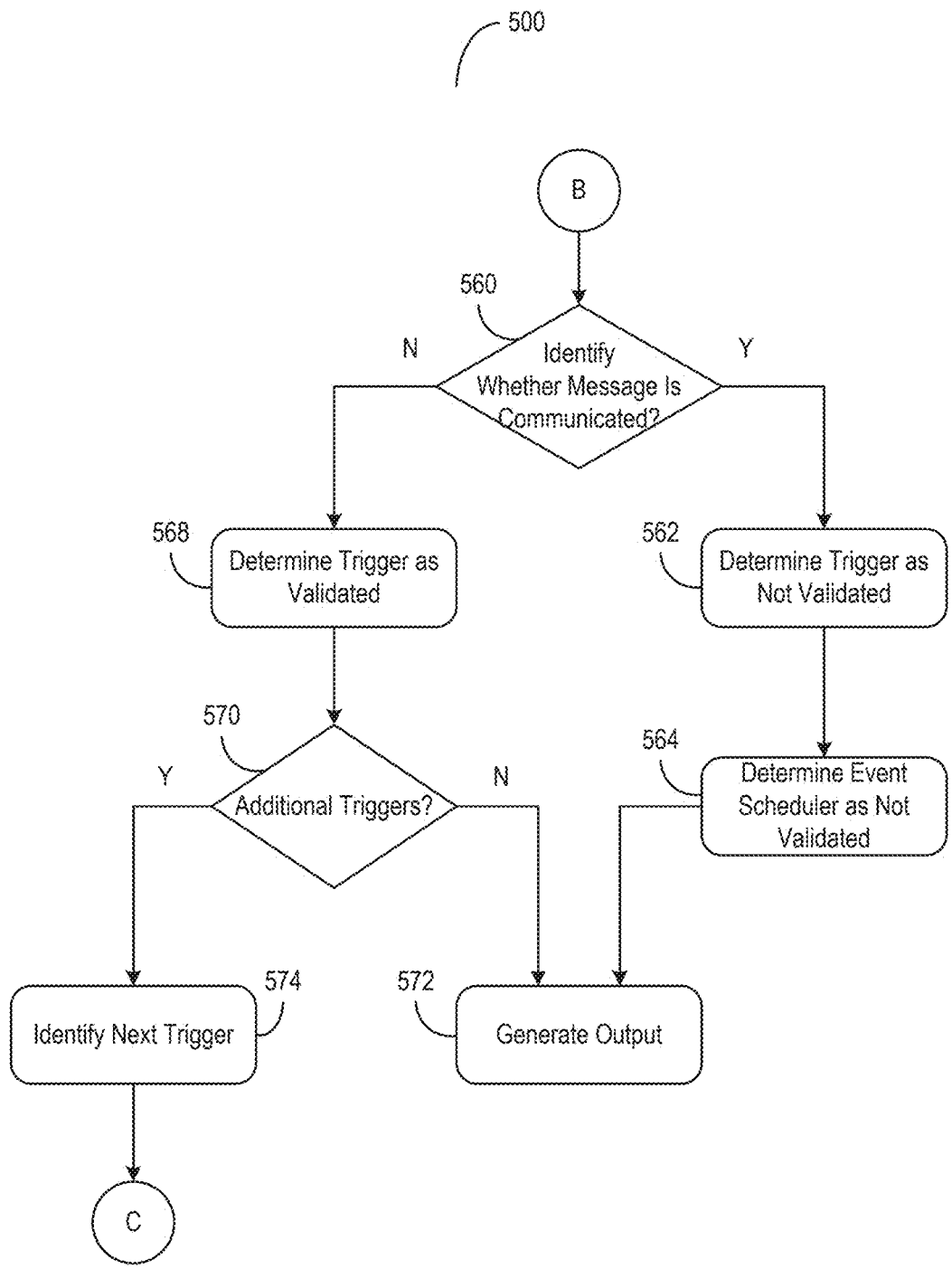

Referring now FIGS. 5A-C, depicted is a flow diagram of a method 500 of simulating testing environments for applications over spans of time. The method 500 may be implemented or performed using any of the components described herein, such as the test management service 105, the session management service 110, or the user device 170, or any combination thereof. Under the method 500, a computing system may identify a set of triggers for an event scheduler (502). The computing system may select a trigger from the set of triggers (504). The computing system may set a clock to a timestamp of the trigger (506). The computing system may cause the service to evaluate the trigger (508). The computing system may determine whether the trigger is satisfied (510).

When the trigger is satisfied, the computing system may identify whether a message is communicated (530). If the message is identified as not communicated, the computing system may determine that the trigger is not validated (532). The computing system may determine that the event scheduler is not validated (534). On the other hand, if the message is identified as communicated, the computing system may determine that the trigger is validated (536). The computing system may determine whether there are additional triggers (538). When there are no more triggers, the computing system may generate an output (540). In contrast, when there are additional triggers, the computing system may identify the next trigger (542), and may repeat the functionality from (506).

Conversely, when the trigger is not satisfied, the computing system may identify whether a message is communicated (560). If the message is identified as communicated, the computing system may determine that the trigger is not validated (562). The computing system may determine that the event scheduler is not validated (564). On the other hand, if the message is identified as not communicated, the computing system may determine that the trigger is validated (566). The computing system may determine whether there are additional triggers (568). When there are no more triggers, the computing system may generate an output (570). In contrast, when there are additional triggers, the computing system may identify the next trigger (572) and may repeat the functionality from (506).

B. Network and Computing Environment

Figure 6:
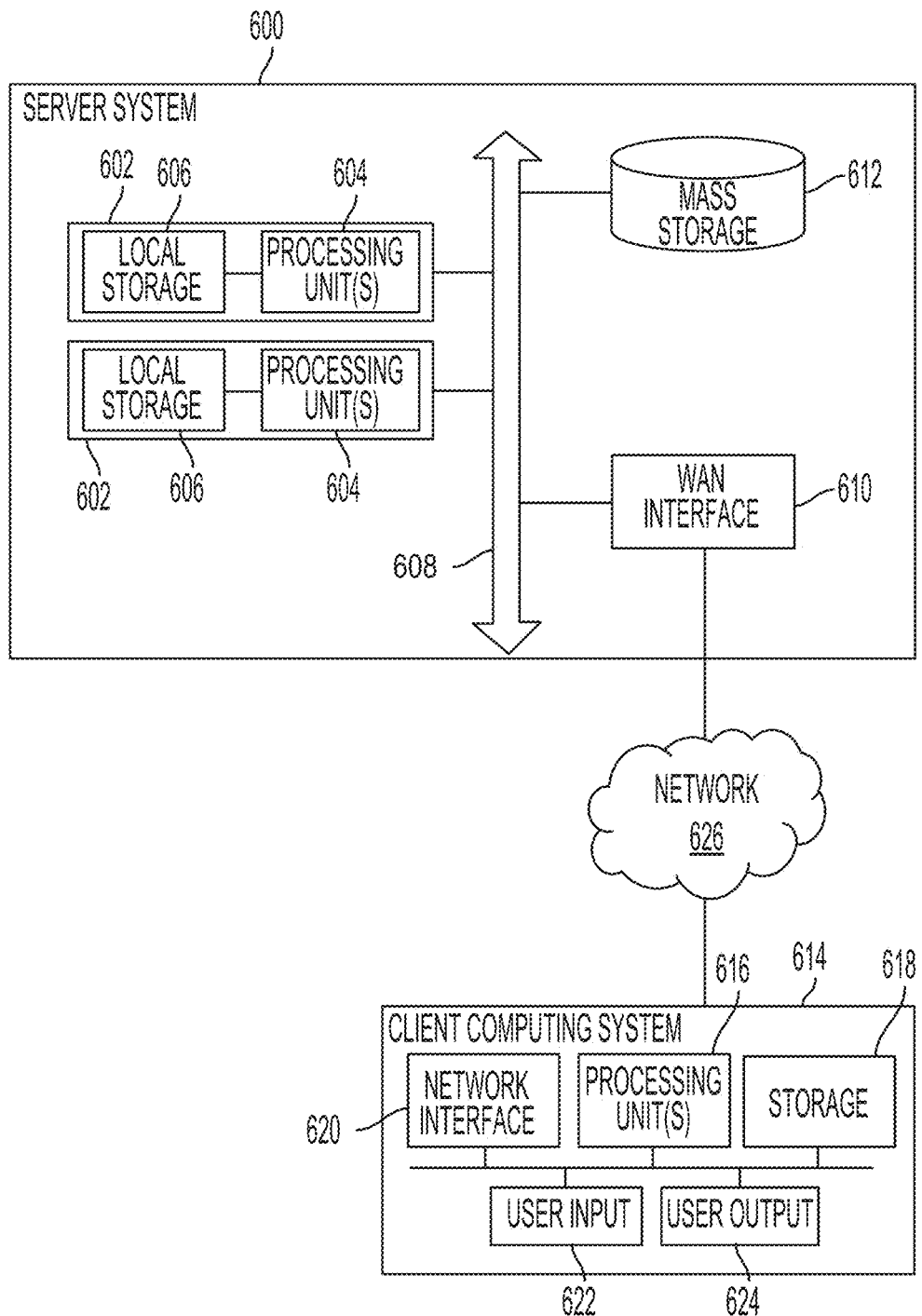
FIG. 6 is a block diagram of a server system and a client computer system in accordance with an illustrative embodiment.

Various operations described herein can be implemented on computer systems. FIG. 6 shows a simplified block diagram of a representative server system 600, client computer system 614, and network 626 usable to implement certain embodiments of the present disclosure. In various embodiments, server system 600 or similar systems can implement services or servers described herein or portions thereof. Client computer system 614 or similar systems can implement clients described herein. The system 100 described herein can be similar to the server system 600. Server system 600 can have a modular design that incorporates a number of modules 602 (e.g., blades in a blade server embodiment); while two modules 602 are shown, any number can be provided. Each module 602 can include processing unit(s) 604 and local storage 606.

Processing unit(s) 604 can include a single processor, which can have one or more cores, or multiple processors. In some embodiments, processing unit(s) 604 can include a general-purpose primary processor as well as one or more special-purpose co-processors, such as graphics processors, digital signal processors, or the like. In some embodiments, some, or all processing units 604 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 604 can execute instructions stored in local storage 606. Any type of processors in any combination can be included in processing unit(s) 604.

Local storage 606 can include volatile storage media (e.g., DRAM, SRAM, SDRAM, or the like) and/or non-volatile storage media (e.g., magnetic or optical disk, flash memory, or the like). Storage media incorporated in local storage 606 can be fixed, removable, or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 604 need at runtime. The ROM can store static data and instructions that are needed by processing unit(s) 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 606 can store one or more software programs to be executed by processing unit(s) 604, such as an operating system and/or programs implementing various server functions, such as functions of the system 100 or any other system described herein, or any other server(s) associated with system 100 or any other system described herein.

"Software" refers generally to sequences of instructions that, when executed by processing unit(s) 604, cause server system 600 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 604. Software can be implemented as a single program or as a collection of separate programs or program modules that interact as desired. From local storage 606 (or non-local storage described below), processing unit(s) 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies, including server racks, hubs, routers, etc.

A wide area network (WAN) interface 610 can provide data communication capability between the local area network (e.g., through the interconnect 608) and the network 626, such as the Internet. Other technologies can be used to communicatively couple the server system with the network 626, including wired (e.g., Ethernet, IEEE 802.3 standards) and/or wireless technologies (e.g., Wi-Fi, IEEE 802.11 standards).

In some embodiments, local storage 606 is intended to provide working memory for processing unit(s) 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. In some embodiments, additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Work allocation techniques can be used. As requests are processed, results can be returned to the requester via WAN interface 610. Such operation can generally be automated. Further, in some embodiments, WAN interface 610 can connect multiple server systems 600 to each other, providing scalable systems capable of managing high volumes of activity. Other techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 6 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include computer components such as processing unit(s) 616, storage device 618, network interface 620, user input device 622, and user output device 624. Client computing system 614 can be a computing device implemented in a variety of form factors, such as a desktop computer, laptop computer, tablet computer, smartphone, other mobile computing device, wearable computing device, or the like.

Processing unit 616 and storage device 618 can be similar to processing unit(s) 604 and local storage 606 described above. Suitable devices can be selected based on the demands to be placed on client computing system 614. For example, client computing system 614 can be implemented as a "thin" client with limited processing capability or as a high-powered computing device. Client computing system 614 can be provisioned with program code executable by processing unit(s) 616 to enable various interactions with server system 600.

Network interface 620 can provide a connection to the network 626, such as a wide area network (e.g., the Internet) to which WAN interface 610 of server system 600 is also connected. In various embodiments, network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or information. In various embodiments, user input device 622 can include any or all of a keyboard, touch pad, touch screen, mouse, or other pointing device, scroll wheel, click wheel, dial, button, switch, keypad, microphone, and so on.

User output device 624 can include any device via which client computing system 614 can provide information to a user. For example, user output device 624 can include display-to-display images generated by or delivered to client computing system 614. The display can incorporate various image generation technologies, e.g., a liquid crystal display (LCD), a light-emitting diode (LED) display including organic light-emitting diodes (OLED), a projection system, a cathode ray tube (CRT), or the like, together with supporting electronics (e.g., digital-to-analog or analog-to-digital converters, signal processors, or the like). Some embodiments can include a device such as a touchscreen that functions as both an input and output device. In some embodiments, other user output devices 624 can be provided in addition to or instead of a display. Examples include indicator lights, speakers, tactile "display" devices, printers, and so on.

Some embodiments include electronic components, such as microprocessors, storage, and memory that store computer program instructions in a computer readable storage medium. Many of the features described in this specification can be implemented as processes that are specified as a set of program instructions encoded on a computer readable storage medium. When one or more processing units execute these program instructions, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 604 and 616 can provide various functionality for server system 600 and client computing system 614, including any of the functionality described herein as being performed by a server or client, or other functionality.

It will be appreciated that server system 600 and client computing system 614 are illustrative and that variations and modifications are possible. Computer systems used in connection with embodiments of the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies, including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or digital versatile disk (DVD), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of simulating testing environments for digital applications, comprising:
   selecting, by one or more processors, a trigger of an event scheduler, the trigger identifying a timestamp to communicate content corresponding to addressing a condition of a user;

automating, by the one or more processors, a test clock on at least one of a service or a user device with a time schedule corresponding to a designated passage of time on a reference clock;

causing, by the one or more processors, activation of the trigger;

identifying, by the one or more processors, whether the content is communicated between the service and the user device in accordance with the trigger;

identifying, by the one or more processors, any issue corresponding with the communication of content or corresponding with whether the content is communicated;

responsive to identifying any issue,
validating or resolving, by the one or more processors, an issue; and
determining, by the one or more processors, the trigger of the event scheduler is validated or resolved.

2. The method of claim 1, further comprising:
selecting, by the one or more processors, a second trigger responsive to determining the trigger is validated, the second trigger identifying a second timestamp corresponding to an end of a time period;
automating, by the one or more processors, the test clock on at least one of the service or the user device with a second time schedule corresponding to a designated passage of time on the reference clock;
causing, by the one or more processors, at least one of the service or the user device to communicate a second content, responsive to activation of the second trigger;
identifying, by the one or more processors, the second content is communicated between the service and the user device in accordance with the second trigger; and
determining, by the one or more processors, the event scheduler is validated in advance of the end of the time period, responsive to identifying the second content is communicated between the service and the user device.

3. The method of claim 2, wherein selecting a trigger comprises selecting a trigger from a plurality of triggers, and wherein determining the event scheduler is validated further comprises determining the event scheduler is validated, responsive to identifying the service successfully transmitted the content for each trigger of the plurality of triggers to the user device.

4. The method of claim 1, further comprising:
automating, by the one or more processors, the test clock on at least one of the service or the user device over a second timestamp of a second trigger;
causing, by the one or more processors, at least one of the service or the user device to communicate a second content, responsive to activation of the second trigger; and
determining, by the one or more processors, the second trigger of the event scheduler is not validated, responsive to identifying a lack of communication of the second content.

5. The method of claim 4, further comprising re-causing, by the one or more processors, at least one of the service or the user device to communicate the second content to the user device for a second attempt, responsive to identifying the lack of the communication of the second content in a first attempt.

6. The method of claim 4, further comprising:
retrieving, by the one or more processors, a transaction log identifying one or more of a plurality of content communicated between the service and the user device, responsive to determining the second trigger is not validated; and
generating, by the one or more processors, an output to include at least one of an indication of a failure to validate the second trigger and an identification of the transaction log.

7. The method of claim 1, further comprising causing, by the one or more processors, using the reference clock accessible to at least one of the service or the user device, at least one of (i) the service to set a service clock corresponding to the test clock from a first timestamp to the timestamp or (ii) the user device to set a device clock corresponding to the test clock from a second timestamp to the timestamp.

8. The method of claim 1, wherein the event scheduler comprises a machine learning model to generate at least a portion of a plurality of triggers for the event scheduler.

9. The method of claim 1, wherein the trigger is from a plurality of triggers, at least one of the plurality of triggers further identifying a criterion to satisfy for at least one of the service or the user device to communicate the content, and wherein causing at least one of the service or the user device to communicate the content further comprises causing at least one of the service or the user device to communicate the content, responsive to data associated with the user device satisfying the criterion identified by the trigger.

10. The method of claim 1, wherein automating the test clock further comprises automating the test clock on at least one of the service or the user device from an initial timestamp corresponding to a current time to the timestamp corresponding to a subsequent time identified by the trigger, in advance of an occurrence of the subsequent time.

11. The method of claim 1, wherein identifying the content is communicated further comprises at least one of: (i) identifying the service transmitted the content using a transmission log associated with the service, (ii) identifying the user device received the content from the service using a receipt log associated with the user device, or (iii) identifying the service received a response from the user device within a time window relative to transmitting the content.

12. The method of claim 1, wherein the content comprises at least one of a short message service (SMS) message, a multimedia messaging service (MMS), or an in-app content, wherein the content is to be presented to a user, at least in partial concurrence with the user being on a medication to address a condition of the user.

13. The method of claim 1, wherein automating the test clock on at least one of the service or the user device to advance in time over a current time comprises increasing a speed of the test clock on at least one of the service or the user device.

14. The method of claim 1, wherein any issue is no issue or at least one issue.

15. A system for simulating testing environments for digital applications, comprising:
one or more processors coupled with memory, configured to:
select a trigger of an event scheduler, the trigger identifying a timestamp to communicate content corresponding to addressing a condition of a user;
automating a test clock on at least one of a service or a user device with a time schedule corresponding to a designated passage of time on a reference clock;
cause, activation of the trigger;
identify whether the content is communicated between the service and the user device in accordance with the trigger identify any issue corresponding with the communication of content or corresponding with whether the content is communicated;
responsive to identifying any issue,
validate or resolve an issue; and
determine the trigger of the event scheduler is validated or resolved.

16. The system of claim 15, wherein the one or more processors are further configured to:
select a second trigger responsive to determining the trigger is validated, the second trigger identifying a second timestamp corresponding to an end of a time period;
automate the test clock on at least one of the service or the user device with a second time schedule corresponding to a designated passage of time on the reference clock;
cause at least one of the service or the user device to communicate a second content, activation of the second trigger;
identify the second content is communicated between the service and the user device in accordance with the second trigger; and
determine the event scheduler is validated in advance of the end of the time period, responsive to identifying the second content is communicated between the service and the user device.

17. The system of claim 16, wherein selecting a trigger comprises selecting a trigger from a plurality of triggers, and wherein the one or more processors are further configured to determine the event scheduler is validated, responsive to identifying the service successfully transmitted the content for each trigger of the plurality of triggers to the user device.

18. The system of claim 15, wherein the one or more processors are further configured to:
automate the test clock on at least one of the service or the user device over a second timestamp of a second trigger;
cause at least one of the service or the user device to communicate a second content, activation of the second trigger; and
determine the second trigger of the event scheduler is not validated, responsive to identifying a lack of communication of the second content.

19. The system of claim 18, wherein the one or more processors are further configured to re-cause at least one of the service or the user device to communicate the second content for a second attempt, responsive to identifying the lack of the communication of the second content in a first attempt.

20. The system of claim 18, wherein the one or more processors are further configured to:
retrieve a transaction log identifying one or more of a plurality of content communicated between the service and the user device, responsive to determining the second trigger is not validated; and
generate an output to include at least one of an indication of a failure to validate the second trigger and an identification of the transaction log.

21. The system of claim 15, wherein the one or more processors are further configured to cause, using the reference clock accessible to at least one of the service or the user device, at least one of (i) the service to set a service clock corresponding to the test clock from a first timestamp to the timestamp or (ii) the user device to set a device clock corresponding to the test clock from a second timestamp to the timestamp.

22. The system of claim 15, wherein the event scheduler comprises a machine learning model to generate at least a portion of a plurality of triggers for the event scheduler.

23. The system of claim 15, wherein the trigger is from a plurality of triggers, at least one of the plurality of triggers further identifying a criterion to satisfy for at least one of the service or the user device to communicate the content, and wherein the one or more processors are further configured to cause at least one of the service or the user device to communicate the content, responsive to data associated with the user device satisfying the criterion identified by the trigger.

24. The system of claim 15, wherein the one or more processors are further configured to automate the test clock of at least one of the service or the user device from an initial timestamp corresponding to a current time to the timestamp corresponding to a subsequent time identified by the trigger, in advance of an occurrence of the subsequent time.

25. The system of claim 15, wherein the one or more processors are further configured to identify the content is communicated by at least one of: (i) identifying the service transmitted the content using a transmission log associated with the service, (ii) identifying the user device received the content from the service using a receipt log associated with the user device, or (iii) identifying the service received a response from the user device within a time window relative to transmitting the content.

26. The system of claim 15, wherein the content comprises at least one of a short content service (SMS) message, a multimedia messaging service (MMS), or an in-app content, wherein the content is to be presented to a user, at least in partial concurrence with the user being on a medication to address a condition of the user.

27. The system of claim 15, wherein to automate the test clock on at least one of the service or the user device to advance in time over a current time, the one or more processors are configured to increase a speed of the test clock on at least one of the service or the user device.

28. The system of claim 15, wherein any issue is no issue or at least one issue.

* * * * *